(12) United States Patent
Schilder et al.

(10) Patent No.: US 10,872,154 B2
(45) Date of Patent: Dec. 22, 2020

(54) SECURE DEVICE STATE APPARATUS AND METHOD AND LIFECYCLE MANAGEMENT

(71) Applicant: Google LLC, Mountain View, CA (US)

(72) Inventors: Marius Schilder, Mountain View, CA (US); Timothy Chen, Mountain View, CA (US); Scott Johnson, Mountain View, CA (US); Harrison Pham, Mountain View, CA (US); Derek Martin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 147 days.

(21) Appl. No.: 16/262,179

(22) Filed: Jan. 30, 2019

(65) Prior Publication Data

US 2019/0163909 A1    May 30, 2019

Related U.S. Application Data

(63) Continuation of application No. 15/396,052, filed on Dec. 30, 2016, now Pat. No. 10,223,531.

(51) Int. Cl.
*G06F 21/57* (2013.01)
*G06F 21/30* (2013.01)
(Continued)

(52) U.S. Cl.
CPC ....... *G06F 21/57* (2013.01); *G01R 31/31719* (2013.01); *G01R 31/318588* (2013.01); *G06F 21/30* (2013.01); *G06F 21/575* (2013.01); *G06F 21/73* (2013.01); *G06F 21/74* (2013.01); *G06F 21/75* (2013.01); *G06F 21/79* (2013.01); *G11C 7/24* (2013.01); *G11C 16/22* (2013.01); *G11C 29/36* (2013.01); *G11C 29/40* (2013.01); *G11C 29/46* (2013.01); *H04L 9/0822* (2013.01);
(Continued)

(58) Field of Classification Search
None
See application file for complete search history.

(56) References Cited

U.S. PATENT DOCUMENTS

| 5,627,478 A | 5/1997 | Habersetzer et al. |
| 6,038,551 A * | 3/2000 | Barlow ............... G06Q 20/105 235/380 |

(Continued)

FOREIGN PATENT DOCUMENTS

WO    2018125325    7/2018

OTHER PUBLICATIONS

Bhat, "Secure Boot and Encrypted Data Storage", Timesys Corporation, Jul. 13, 2017, 7 pages.

(Continued)

*Primary Examiner* — Jason Chiang
(74) *Attorney, Agent, or Firm* — Colby Nipper

(57) ABSTRACT

A semiconductor chip device include device state fuses that may be used to configure various device states and corresponding security levels for the semiconductor chip as it transitions from wafer manufacturing to provisioned device. The device states and security levels prevent the semiconductor chip from being accessed and exploited, for example, during manufacturing testing. A secure boot flow process for a semiconductor chip over its lifecycle is also disclosed. The secure boot flow may start at the wafer manufacturing stage and continue on through the insertion of keys and firmware.

20 Claims, 13 Drawing Sheets

(51) Int. Cl.

| | | |
|---|---|---|
| *H04L 9/08* | (2006.01) | |
| *G01R 31/317* | (2006.01) | |
| *G06F 21/73* | (2013.01) | |
| *G06F 21/74* | (2013.01) | |
| *G06F 21/75* | (2013.01) | |
| *G06F 21/79* | (2013.01) | |
| *G11C 7/24* | (2006.01) | |
| *G11C 16/22* | (2006.01) | |
| *G11C 29/36* | (2006.01) | |
| *G11C 29/40* | (2006.01) | |
| *G11C 29/46* | (2006.01) | |
| *G01R 31/3185* | (2006.01) | |
| *G11C 17/14* | (2006.01) | |
| *G11C 17/18* | (2006.01) | |
| *G11C 29/04* | (2006.01) | |
| *G11C 29/44* | (2006.01) | |

(52) U.S. Cl.
CPC ............ *H04L 9/0861* (2013.01); *G11C 17/14* (2013.01); *G11C 17/18* (2013.01); *G11C 2029/0401* (2013.01); *G11C 2029/0403* (2013.01); *G11C 2029/4402* (2013.01)

(56) References Cited

U.S. PATENT DOCUMENTS

| | | | |
|---|---|---|---|
| 7,316,934 B2 | 1/2008 | Mangell | |
| 7,498,644 B2 | 3/2009 | Shapiro et al. | |
| 7,725,788 B2 | 5/2010 | Tkacik et al. | |
| 7,755,502 B2 | 7/2010 | Diluoffo et al. | |
| 7,778,420 B2 | 8/2010 | Kocher et al. | |
| 7,853,805 B1 | 12/2010 | Srinivasa et al. | |
| 7,935,603 B1 | 5/2011 | Chow et al. | |
| 7,962,766 B2 | 6/2011 | Fagan | |
| 8,089,285 B2 | 1/2012 | Hsu et al. | |
| 8,255,839 B2 | 8/2012 | Ivaldi | |
| 8,418,006 B1 | 4/2013 | Trimberger | |
| 8,732,468 B2 | 5/2014 | Roy et al. | |
| 9,071,446 B2 | 6/2015 | Kreft | |
| 9,183,412 B2 | 11/2015 | Bye et al. | |
| 9,189,617 B2 | 11/2015 | Sherman | |
| 9,202,060 B2 | 12/2015 | Geukes et al. | |
| 9,203,617 B2* | 12/2015 | Ducharme | H04L 9/3271 |
| 9,218,511 B2 | 12/2015 | Thacker | |
| 9,230,112 B1 | 1/2016 | Peterson et al. | |
| 9,305,183 B2 | 4/2016 | Mittal | |
| 10,003,467 B1* | 6/2018 | Miller | H04L 9/0891 |
| 10,171,251 B2 | 1/2019 | Kreft | |
| 10,223,531 B2 | 3/2019 | Schilder et al. | |
| 2001/0015654 A1 | 8/2001 | Habersetzer et al. | |
| 2004/0153900 A1* | 8/2004 | Adams | G11C 29/802 714/710 |
| 2006/0236111 A1* | 10/2006 | Bodensjo | H04L 9/3247 713/176 |
| 2008/0104551 A1 | 5/2008 | Ouellette et al. | |
| 2009/0202069 A1* | 8/2009 | Cox | H04L 9/0822 380/44 |
| 2009/0259854 A1* | 10/2009 | Cox | G09G 5/001 713/189 |
| 2010/0199077 A1* | 8/2010 | Case | H04L 9/3271 713/1 |
| 2011/0029815 A1* | 2/2011 | Case | G06F 11/2284 714/36 |
| 2012/0102334 A1 | 4/2012 | O'Loughlin et al. | |
| 2012/0198224 A1* | 8/2012 | Leclercq | H04L 9/088 713/2 |
| 2013/0013905 A1 | 1/2013 | Held et al. | |
| 2013/0033935 A1 | 2/2013 | Tu et al. | |
| 2014/0201540 A1* | 7/2014 | Li | H04L 9/0891 713/193 |
| 2014/0230052 A1 | 8/2014 | Zhang et al. | |
| 2015/0006968 A1 | 1/2015 | Shanbhogue et al. | |
| 2016/0171223 A1* | 6/2016 | Covey | G06F 21/602 713/189 |
| 2016/0239663 A1* | 8/2016 | Healy | G06F 21/554 |
| 2017/0041302 A1* | 2/2017 | Oxford | H04L 63/045 |
| 2017/0180314 A1* | 6/2017 | Walker | H04L 9/083 |
| 2018/0189493 A1 | 7/2018 | Schilder et al. | |

OTHER PUBLICATIONS

Sukhomlinov, et al., "Supply Chain Verification of Hardware Components Using Open-Source Root of Trust", Technical Disclosure Commons; Retrieved from https://www.tdcommons.org/dpubs_series/2884, Jan. 22, 2020, 14 pages.

"International Preliminary Report on Patentability", PCT Application No. PCT/US2017/051676, dated Feb. 22, 2019, 14 pages.

"Foreign Office Action", Taiwanese Application No. 106125403, dated Sep. 20, 2018, 5 pages.

"International Search Report and Written Opinion", PCT Application No. PCT/US2017/051676, dated Jan. 22, 2018, 15 pages.

"Notice of Allowance", U.S. Appl. No. 15/396,052, dated Oct. 11, 2018, 6 pages.

"Pre-Interview Communication", U.S. Appl. No. 15/396,052, dated Aug. 1, 2018, 4 pages.

"Written Opinion", PCT Application No. PCT/US2017/051676, dated Aug. 29, 2018, 6 pages.

* cited by examiner

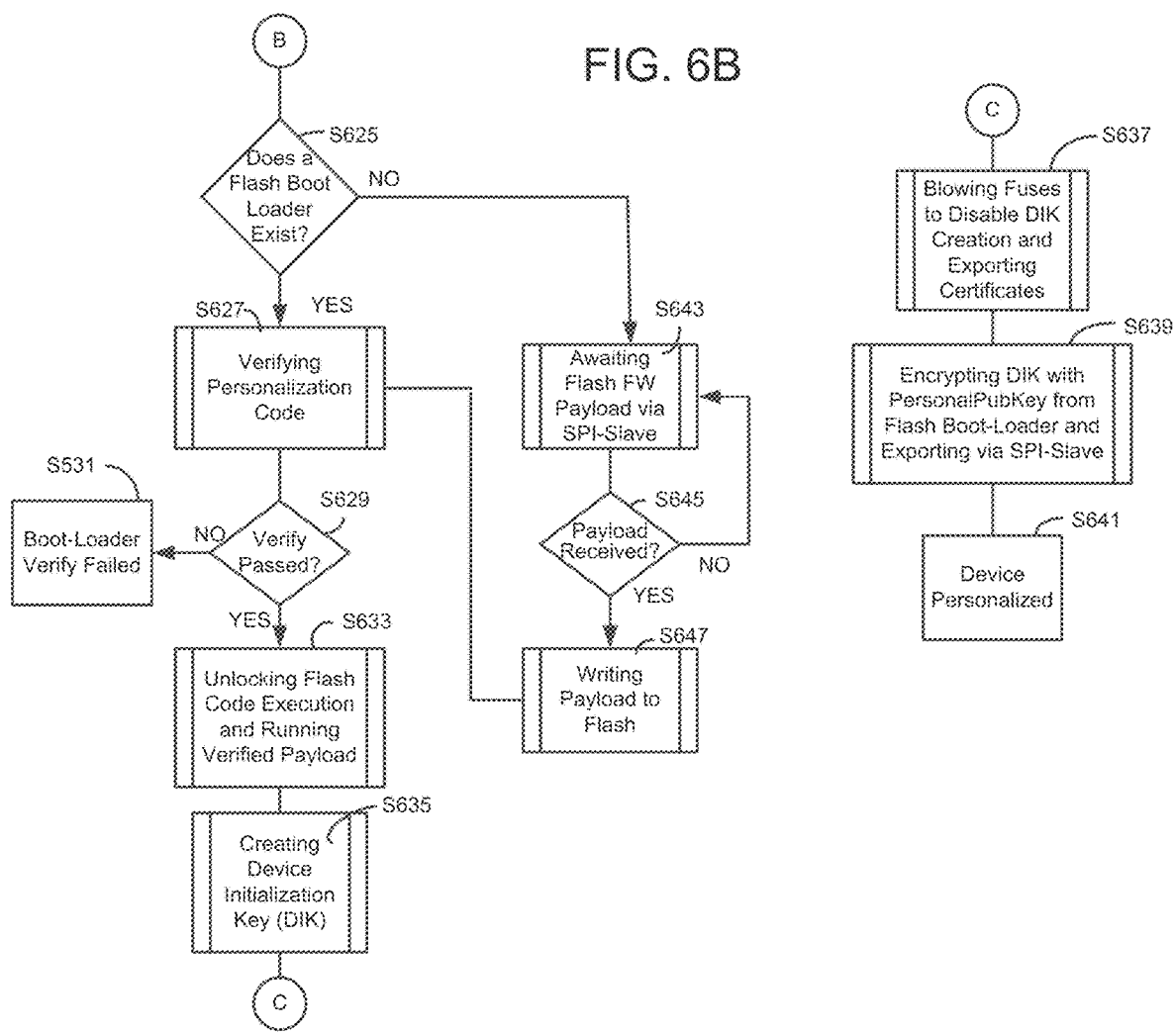

ced device state, wherein the test-mode-enabled device state permits manufacturing testing to be performed on the semiconductor chip device; in response to the semiconductor chip device passing manufacturing testing, changing the test-mode-enabled bit pattern to a test-mode-locked bit pattern to change the device state from the test-mode-enabled device state to a test-mode-locked device state; and altering a security level of the semiconductor chip device based on changes to the device state.

SECURE DEVICE STATE APPARATUS AND METHOD AND LIFECYCLE MANAGEMENT

RELATED APPLICATION

This application claims priority and is a continuation of U.S. Utility patent application Ser. No. 15/396,052, filed on Dec. 30, 2016, which is incorporated herein by reference in its entirety.

BACKGROUND

Technical Field

The subject matter described herein generally relates to the field of semiconductor chip manufacturing and includes security measures throughout the semiconductor chip lifecycle and also for secure boot flow.

Background Information

In semiconductor chip manufacturing, semiconductor chips may be formed together as a wafer and tested while part of the wafer. Then a wafer may be diced into individual chips/devices where they undergo further testing followed by provisioning before being incorporated into products. In some instances, it may be useful to re-provision chip devices for alternative applications during or after manufacturing.

One-time programmable non-volatile storage technology has become widely used in semiconductor chip manufacturing. Examples of such one-time programmable non-volatile storage technology include fuses such as e-Fuses, anti-fuses, or laser fuses. Such fuses may be used to change the configuration of semiconductor chips after they are manufactured as well as to tune performance. Fuses may also be used for chip ID storage and cryptographic key storage.

E-Fuse technology includes one-time programmable non-volatile storage technology in which e-Fuse bit(s) may be set to 1 only once while the un-programmed bit(s) may have zero values. An available e-Fuse technology uses electrically programmable PMOS gate oxide anti-fuses in which a read operation requires only the core IC power supply, whereas programming may be performed using an external power supply.

E-Fuses may be arranged as independent fuse macros, in which each macro may have a capacity, for example, in the range of 64-bit to 1-kbit in 64 bit increments.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to semiconductor chip devices. More specifically, aspects of the present disclosure relate to securing semiconductor chip devices throughout its lifecycle and securing a boot flow operation.

As aspect includes a method of securing a semiconductor chip device having a plurality of device sate fuses, the method comprising: changing a raw device bit pattern stored in the device state fuses to a test-mode-enabled bit pattern to change a device state from a raw device state to a test-mode-enabled device state, wherein the test-mode-enabled device state permits manufacturing testing to be performed on the semiconductor chip device; in response to the semiconductor chip device passing manufacturing testing, changing the test-mode-enabled bit pattern to a test-mode-locked bit pattern to change the device state from the test-mode-enabled device state to a test-mode-locked device state; and altering a security level of the semiconductor chip device based on changes to the device state.

Additional aspects relate to a method that, in response to changing the device state from a raw device state to a test-mode-enabled device state, altering a raw device state security level in which test modes and ports are not accessible from outside the chip to a test-mode-enabled security level in which manufacturing tests on the semiconductor chip device may be conducted via one or more of the ports.

Further aspects include a method that, in response to changing the device state from a test-mode-enabled device state to a test-mode-locked device state, altering a test-mode enabled security level in which test modes and ports are accessible from outside the chip to a test-mode-locked security level in which manufacturing tests on the semiconductor chip device are locked.

Still further aspects includes a method that, in response to the semiconductor chip device failing the manufacturing testing, changing the test-mode-enabled bit pattern to a test-mode-disabled bit pattern to change the device state from the test-mode-enabled device state to a test-mode-disabled device state; and in response to changing the device state from a test-mode-enabled device state to a test-mode-disabled device state, altering the security level altering a test-mode enabled security level in which test modes and ports are accessible from outside the chip to a test-mode-disabled security level in which manufacturing tests and ports on the semiconductor chip device are disabled.

Yet further aspects include a method that, in response to the device state fuses being changed to a bit pattern that does not match a known bit pattern corresponding to a known mode, modifying the bit pattern in the device state fuses to a disabled mode bit pattern and altering the security level to a disabled security level in which all ports and memory in the semiconductor chip device are disabled.

Still further aspects include wherein the semiconductor chip device further comprises a boot loader process, the method further comprises, in response to the boot loader process verifying that a correct unlock password is received by the chip device together with an unlock request, the altering the security level unlocking the chip device by allowing the values of the device state fuses to be changed to the test-mode-enabled pattern.

Additional aspects include a semiconductor chip device, comprising: device state fuses storing bit patterns indicative of device states of the semiconductor chip device; a processor operably connected to the device state fuses, a storage device storing instructions that, when executed by the processor, cause the processor to: change a raw device bit pattern stored in the device state fuses to a test-mode-enabled bit pattern to change the device state from a raw device state to a test-mode-enabled device state, wherein the test-mode-enabled device state permits manufacturing testing to be performed on the semiconductor chip device; in response to the semiconductor chip device passing manufacturing testing, change the test-mode-enabled bit pattern to a test-mode-locked bit pattern to change the device state from the test-mode-enabled device state to a test-modelocked device state; and alter a security level of the semiconductor chip device based on changes to the device state.

Other aspects include a semiconductor chip device, further comprising: one or more ports; the storage devices storing further instructions that, when executed by the processor, cause the processor to: in response to changing the device state from a raw device state to a test-mode-enabled device state, alter a raw device state security level in which test modes and the ports are not accessible from outside the chip to a test-mode-enabled security level in which manufacturing tests on the semiconductor chip device may be conducted via one or more of the ports.

Still other aspects include a semiconductor chip device, further comprising: one or more ports; the storage devices storing further instructions that, when executed by the processor, cause the processor to: in response to changing the device state from a test-mode-enabled device state to a test-mode-locked device state, alter a test-mode enabled security level in which test modes and the ports are accessible from outside the semiconductor chip device to a test-mode-locked security level in which manufacturing tests on the semiconductor chip device are locked.

Yet further aspects include a semiconductor chip device, further comprising: one or more ports; the storage devices storing further instructions that, when executed by the processor, cause the processor to: in response to the semiconductor chip device failing the manufacturing testing, change the test-mode-enabled bit pattern to a test-mode-disabled bit pattern to change the device state from the test-mode-enabled device state to a test-mode-disabled device state; and in response to changing the device state from a test-mode-enabled device state to a test-mode-disabled device state, said altering the security level altering a test-mode enabled security level in which test modes and ports are accessible from outside the semiconductor chip device to a test-mode-disabled security level in which manufacturing tests and ports on the semiconductor chip device are disabled.

Still yet further aspects include a semiconductor chip device, the storage devices storing further instructions that, when executed by the processor, cause the processor to: in response to the device state fuses being changed to a bit pattern that does not match a known bit pattern corresponding to a known mode, modify the bit pattern in the device state fuses to a disabled mode bit pattern and said altering the security level altering the security level to a disabled security level in which all ports and memory in the semiconductor chip device are disabled.

A still further aspect includes a semiconductor chip device further comprising: the storage device storing a boot loader process, the storage devices storing further instructions that, when executed by the processor, cause the processor to: in response to the boot loader process verifying that a correct unlock password is received by the semiconductor chip device together with an unlock request, the altering the security level unlocking the chip device by allowing the values of the device state fuses to be changed to the test-mode-enabled pattern.

Additional aspects include a method of provisioning a semiconductor chip device, comprising: in response to a payload including boot processing code being written to a non-volatile memory of the semiconductor chip device, verifying the authenticity of the boot processing code; creating an initialization key; disabling external access to the initialization key and exporting certificates for the initialization key, the external access being access to memory of the semiconductor chip device via an input port; encrypting the initialization key using a public key; exporting the encrypted initialization key; configuring the semiconductor chip device by programming fuses of the semiconductor chip device; deriving provisioning keys using the initialization key; proving identity and decrypting provisioning data using the provisioning keys; and verifying that the provisioning data is valid.

Further aspects include wherein the non-volatile memory is a flash memory.

Yet further aspects include wherein the public key used in encrypting the initialization key is maintained in the boot processing code.

Still yet further aspects include wherein the provisioning data includes application-specific flash firmware, the method further comprising the boot processing code allowing storage of the flash firmware in the flash memory.

Even further aspects include wherein the boot processing code is a boot loader.

Additional aspects include a semiconductor chip device, comprising: fuses; a non-volatile memory; an input port; a processor; a storage device storing instructions that, when executed by the processor, cause the processor to: in response to a payload including boot processing code being written to the non-volatile memory, verify the authenticity of the boot processing code; create an initialization key; disable external access to the initialization key and exporting certificates for the initialization key, the external access being access to the non-volatile memory of the semiconductor chip device via the input port; encrypt the initialization key using a public key; export the encrypted initialization key; configure the semiconductor chip device by programming the fuses; derive provisioning keys using the initialization key; prove identity and decrypt provisioning data using the provisioning keys; and verify that the provisioning data is valid.

Further aspects include a semiconductor chip device wherein the non-volatile memory is a flash memory.

Still further aspects include a semiconductor chip device wherein the public key used in said encrypting the initialization key is maintained in the boot processing code.

Still yet further aspects include a semiconductor chip device wherein the provisioning data includes application-specific flash firmware, wherein the boot processing code allows storage of the flash firmware in the flash memory.

Even further aspects include a semiconductor chip device wherein the boot processing code is a boot loader.

It should be noted that embodiments of some or all of the processor and memory systems disclosed herein may also be configured to perform some or all of the method embodiments disclosed above. In addition, embodiments of some or all of the methods disclosed above may also be represented as instructions embodied on a non-transitory processor-readable storage media such as optical or magnetic memory.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF THE DRAWINGS

These and other objects, features, and characteristics of the present disclosure will become more apparent to those skilled in the art from a study of the following Detailed Description in conjunction with the appended claims and drawings, all of which form a part of this specification. In the drawings:

FIGS. 6A and 6B are flow diagrams for chip lifecycle for a wafer according to aspects of the present invention;

Figure 1:
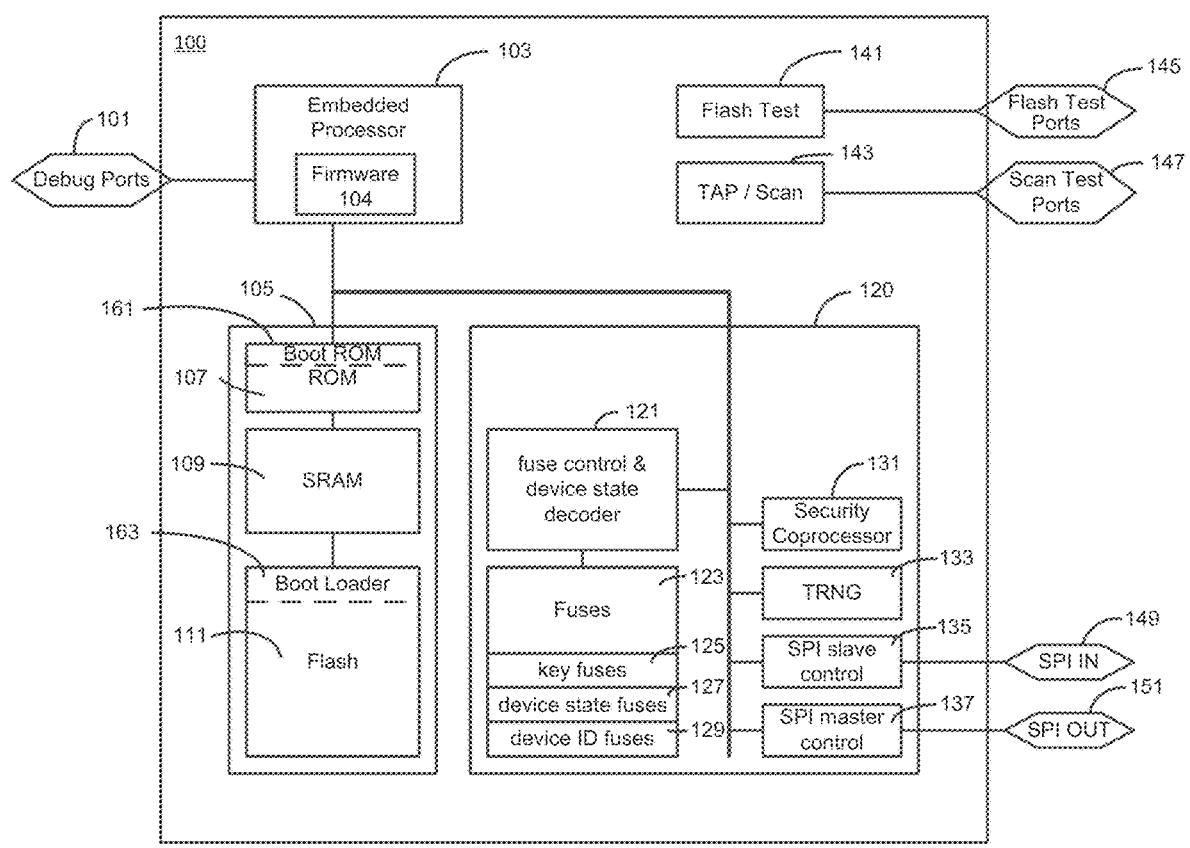
FIG. 1 is a block diagram for an example chip according to aspects of the present invention.

The figures depict embodiments of the disclosed invention for purposes of illustration only. One skilled in the art will recognize from the following discussion that alternative embodiments of the structures and methods illustrated herein may be employed without departing from the principles of the invention described herein.

DETAILED DESCRIPTION

The following description refers to the accompanying drawings. The same reference numbers in different drawings may identify the same or similar elements. The following description is not intended to limit the scope. Instead, the scope is defined by the appended claims.

A semiconductor chip, also referred to herein as a chip, device may be vulnerable to various forms of attack not only as part of a final product but during manufacturing of the chip device itself. Attacks on a chip device in a product may be made to determine the internal configuration and functions of the chip device. One-time programmable storage technology, such as fuses, are vulnerable to attack including physical tampering, such as physically cutting the wire that indicates '0' causing it to become an open '1', or rebuilding a fuse by depositing metal in order to convert the open '1' to '0'.

Fuse sensing requires an electrical query of the fuse state. Such fuse sensing can only be performed a certain number of times and has a lifetime sensing limit as defined by the manufacturing of the e-Fuse. To avoid too much fuse sensing, a "shadow copy" of the fuse may be created. Right after a reset, a fuse controller may sense the fuse value and write the result into a register which becomes the "shadow copy." Future queries of the state may simply read the value of the shadow register rather than electrically sensing the fuse. If an attacker wants to modify a fuse value, the attacker may either attack the physical eFuse itself or the shadow register. By confirming that the fuse and the shadow copy are the same value, however, the attacker would need to attack both the fuse and the shadow copy if the fuse attack occurred after reset sensing.

During manufacturing testing, security-sensitive test modes of a chip device may be accessed and exploited, such that secret information may be extracted. Attacks may be made during chip manufacturing to alter the configuration or operation of the chip device for unintended uses. Chip devices that do not pass manufacturing tests may be discarded even if they are partially operable thus making discarded devices vulnerable to attack and exploitation. In the case of secure chip devices, such attacks that may enable extraction of secret information. Also, testing processes performed during manufacturing may leak information, such as information pertaining to internal operations, and such leaked information may compromise the configuration and provisioning processes. A provisioning payload provided during the provisioning process may be at risk of being altered. Also, information that may be leaked during the device provisioning process may include a process of creating a device-unique identifier and secret.

Aspects of the invention provide solutions to these and other problems.

The lifecycle of chip devices may include manufacturing testing of chip devices that are included in a physical semiconductor wafer, dicing the wafer into the individual chip devices, testing the diced chip devices, provisioning, and re-provisioning.

Aspects of the invention include security measures for a physical semiconductor wafer and individual chip devices over a device lifecycle or a part of the device lifecycle. Aspects of the invention include a secure boot flow that is performed over at least part of the device lifecycle. A secure boot flow may include control by boot firmware in conjunction with certain test and provisioning operations.

An aspect of the invention is intrusion detection for each secure chip due to tampering over its lifecycle as it moves from a blank, untested, and untrusted part on a wafer through testing phases, dicing into an individual chip, further testing, mass production, provisioning, and re-provisioning lifecycle phases.

An aspect of the invention is a secure chip device in which intrusion due to tampering of one-time programmable memory is detected over the lifecycle of the chip device. In response to detecting such tampering, the chip device may be made to permanently disable access to and performance of internal functions of the chip device. The general term "fuse" is used interchangeably with one-time programmable memory technologies.

An example semiconductor chip device 100 is shown in FIG. 1. The semiconductor chip device, or chip device, 100 includes a number of access ports. The access ports may include debug ports 101, one of which may be a serial wire debug (SWD) port which provides a path to fuses 123. Other ports may also be included to provide access for testing such as Flash Test Ports 145 and Scan Test Ports 147. The Flash Test Ports 145 have an associated Flash Test control 141. The Scan Test Ports 147 have an associated TAP/Scan control 143.

The chip device 100 may be an SPI slave device in which commands and data may be transmitted using SPI pins, SPI IN 149 and SPI OUT 151 having respective SPI slave control 135 and SPI master control 137.

In an example embodiment, there may fuses 123 which serve as bit-storage devices. As a non-limiting example, the fuses 123 may be 27-bit storage devices but it is understood that the number of bits may vary depending upon the application.

In example embodiments, the fuses 123 may be implemented as a redundant set of fuse shadow registers and fuse macros (see FIG. 9, described later). Still further, the fuses may be implemented as a set of fuse macros.

In an example embodiment, the fuses 123 may include key fuses 125, device state fuses 127, and device ID fuses 129.

Key fuses 125 may be used to store keys and other secrets. For example, key fuses 125 may store secret data that is a key, or used to derive a key. A specific example is a Device Initialization Key (DIK), which may act as the root shared secret between the device 100 and a key management server 307.

The device state fuses 127 store and define the device state. More specifically, device state fuses 127 may include a set or bank of fuses with each set/bank defining an incremental state of the device as it undergoes manufacturing testing.

The device ID fuses 129 store a unique device ID of the semiconductor device 100.

Fuses 123 may have an associated fuse controller and device state decoder 121. In an example embodiment, device states may be derived as a function of a bit pattern stored in the device state fuses 127 using a device state decoder 121. The reading of the device state fuses 127 may be done directly or via fuse shadow registers (shown in FIG. 9). Furthermore, a comparison operation may also be performed between the device state fuse 127 values and the shadow fuse register value to ensure that that the fuses 127 and/or registers haven't been attacked or tampered. Such comparison operations may also be performed when reading the key fuses 125 and/or device ID fuses 129.

Figure 2:
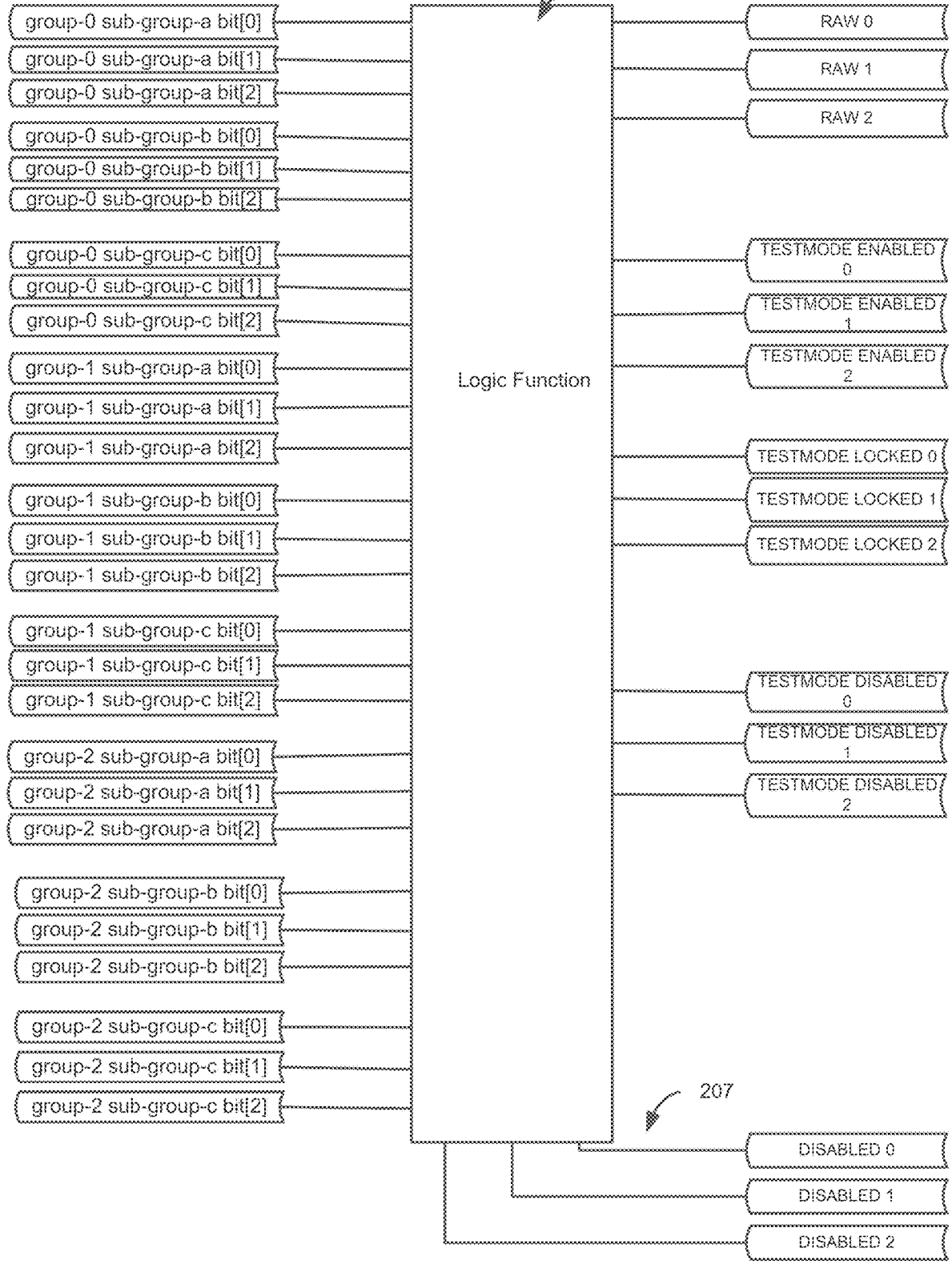
FIG. 2 is a block diagram for an example device state decoder according to aspects of the present invention.

FIG. 2 is a block diagram for device state decoder 121. The device state decoder 121 may include a logic function circuit 203 that maps bit patterns from device state fuses 127, as an input, to one of a plurality device states, as outputs, based on an arbitrary function. In an example embodiment, the device state decoder 121 may include a logic function circuit that maps a 27-bit pattern of the bit-storage devices as an input 201, to one of five device states as outputs 205. In an example embodiment, the fifth state may be a disabled state 207 that is reached as a result of failure of reaching any one of the other four states.

In an example embodiment, each of the five device state decoder output ports 205 may be redundantly encoded in 3-bits. In this example embodiment, the 27 raw device fuse bits are processed by the device state decoder 121 and results are used to set the device state to one of 3 physical states before passing it on to the system. There may be a hardware decoder that reads the 27 bits and sends out signals (wires) to anyone that needs the value of the device state. The current state may be transmitted by a simple signal transmission of shared results.

The chip device 100 may include an embedded processor 103 and memory 105 components, including non-volatile memories such as ROM 107 and Flash memory 111 as well as a small on-chip RAM such as SRAM 109. Over the course of the chip device 100 lifecycle, a payload including a Boot ROM 161 may be written into ROM 107, and a Boot Loader 163 may be written into Flash memory 111.

The chip device 100 may include security processing functions. A security coprocessor 131 may be used to process security algorithms, such as a secure hash algorithm. Example secure hash algorithms include the SHA family of algorithms. Also, a random number generator, such as a true random number generator (TRNG) 133, may be included to provide random values.

After wafer production, chip devices on a wafer undergo testing and may undergo a personalization process. As will be discussed later, the personalization process includes insertion of device-unique ID and keys into device ID fuses 129 and key fuses 129.

Figure 3:
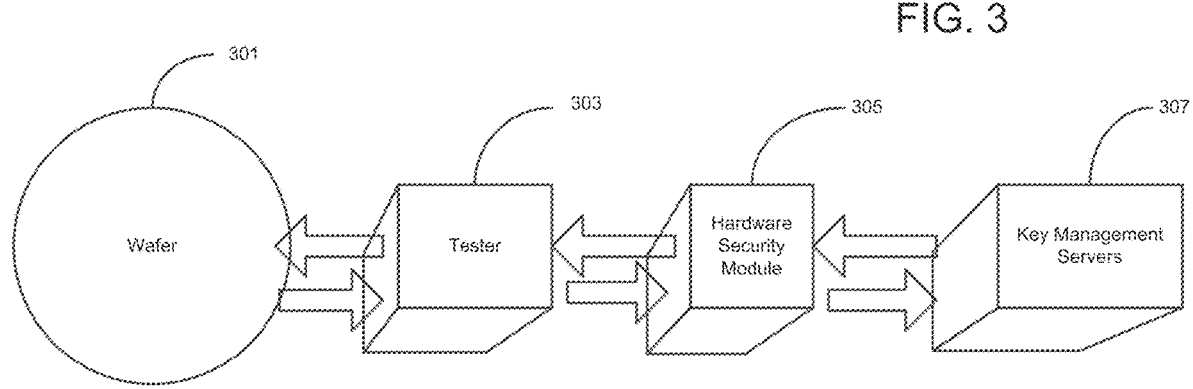
FIG. 3 is a diagram for a wafer test-floor system according to aspects of the present invention.

FIG. 3 illustrates an example test floor system for a wafer. A tester 303 has access to test ports for each chip device 100 (FIG. 1) and may provide power and commands needed to perform testing. To personalize the chip devices 100 (not shown in FIG. 3, but it is envisioned that wafer 301 will include multiple chip devices 100), a key-management server (KMS 307) may send and receive data, to and from the chip devices 100 on the wafer 301, by means of a hardware security module (HSM 305) on the manufacturing floor (located between the tester 303 and an internet connection). The HSM 305 may not be relied upon directly for the confidentiality of the device-unique keys. Rather, it may be used to buffer up payloads to handle temporary connectivity issues with the KMS 307, and to monitor and gather statistics about operations being performed during the personalization process.

The testing and personalization process may be supplemented with mechanisms for controlling the chip devices in order to counter the potential for various attacks over the device's lifecycle. An aspect of the invention includes a life-cycle of a chip device that may be broken into multiple stages each of which may have plural states. In one embodiment, the product lifecycle may be broken down into various stages and several states. The stages may include a wafer stage and a package stage depending on whether the manufacturing chip devices are part of a wafer or are in the form of individual packages.

Figure 4:
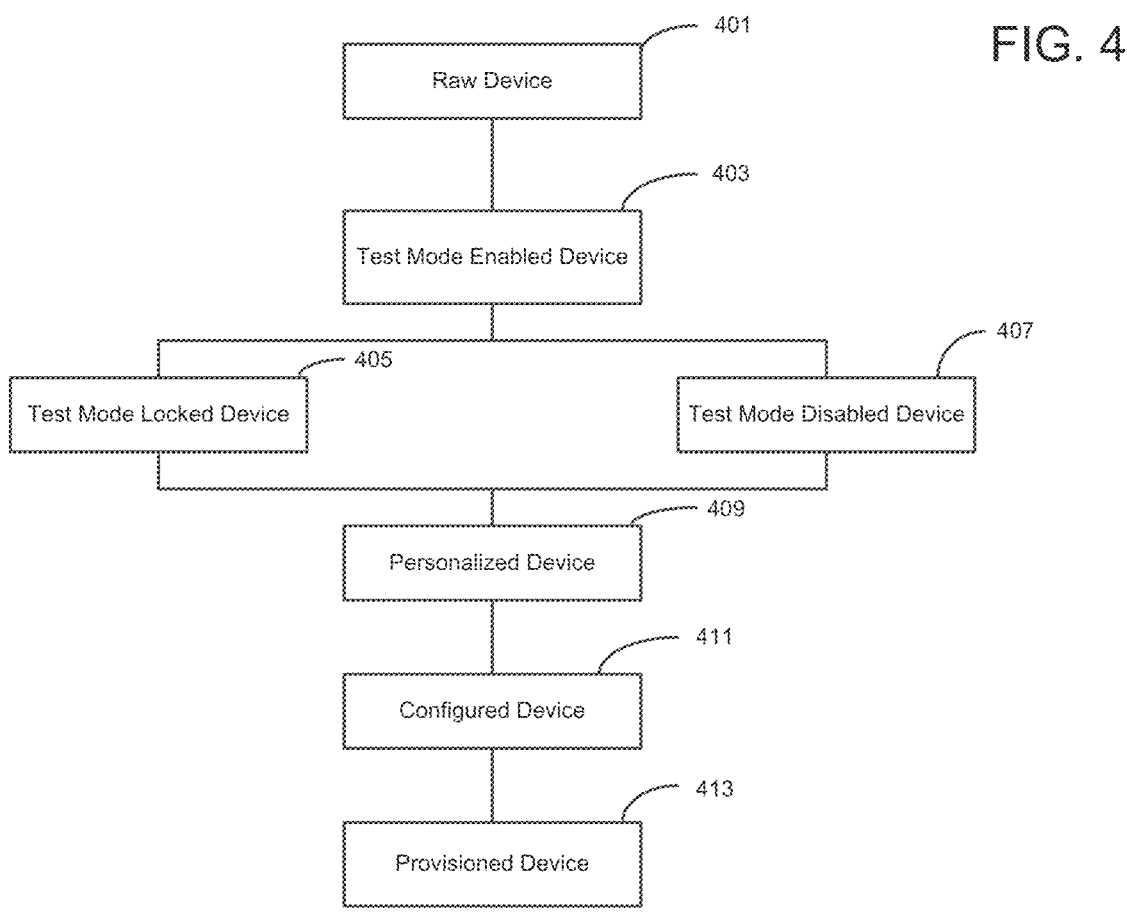
FIG. 4 is a flow diagram for chip lifecycle according to aspects of the present invention.

FIG. 4 is a high-level diagram illustrating example states of a chip lifecycle. The mechanism for transitioning between these states will be described later. FIG. 4 shows states in a sequential ordering. However, the choice of states that go in the wafer stage and the package stage may be varied.

FIG. 4 shows an example of states that may include: Raw Device 401 state, Test-Mode-Enabled Device 403 state, Test-Mode-Locked Device 405 state, Test-Mode-Disabled Device 407 state, Personalized Device 209 state, Configured Device 411 state, and Provisioned Device 413 state. As will be discussed in more detail later, the first three states may be hard physical states of the device, and may be defined by fuses. In an example embodiment, the physical states of the device may be defined based on fuse values stored in device state registers 127. As will be further explained below, there are security level(s) associated with the device states including a raw device state security level, test-mode-enabled device state security level; test-mode-locked device state security level, test mode disabled device state security level, personalized device state security level, configured device state security level, and provisioned device state security level. As also explained below, changes to the device state may trigger a change to the security level.

A chip device may have various degrees of lock down/security levels. "Lock down" or "security level" may refer to explicit actions that are taken that affect chip access. For example, a chip device is said to be locked down when all access ports are disabled. In some embodiments, the memories may also be disabled. A chip device is said to be mainly locked when minimal access is allowed to one path that enables incrementing to a next state. Other degrees of a locked chip device may include limited access to ports to a greater extent than the Raw Device 401 state.

In the initial state, Raw Device 401 state, each chip 100 has a raw device security level in which the chip is mostly locked down such that the debug ports 101, scan test port 147, and flash test ports 145, are not accessible outside the chip 100. To implement the raw device security level, port blocking may be accomplished by inhibiting the data path between the outside world and the internal logic of the chip 100.

The Raw Device 401 state may be first fused into the next state, for example, test-Mode-Enabled Device 403 state to start a manufacturing testing process. In an example embodiment, the Raw Device 401 state may be a state in which all device state fuses 127 are in their un-programmed default state (raw device bit pattern), such as by way of example all set to zero. A chip is said to be fused into a next state by blowing, setting, or changing specific fuses of the device state fuses 127. In the case of a one-time programmable memory, blowing a fuse may take the form of programming the fuse to a second fuse state, such as changing the fuse state from 0 to 1 in the example where all the fuses are 0. In an example embodiment, a chip device in the Raw Device 401 is mainly locked (raw device state security level) such that a command may be sent over the serial wire debug port 101. The command may cause a test-mode-enabled bit pattern to be written to the fuses to increment to the Test Mode-Enabled Device 403 state.

In response to the change in device state, a corresponding change is made to the security level from raw device state security level to test-mode-enabled security level. In the test-mode enabled security level: all ports (Debug Ports 101, Flash Test Ports 145, and Scan Test Ports 147) are open. Port opening may be accomplished by enabling the data paths of the ports when the device state decoder 121 determines that the device state is in the Test-Mode-Enabled Device state.

In the Test-Mode-Enabled Device 403 state the device-unique identifier may be fused into device ID fuses 129, manufacturing tests may be run, and failed devices may be marked for destruction. Failed devices may be marked for destruction by physical marking etching, or by other physical means.

Upon successful completion of the manufacturing testing process, the device 100 transitions from Test-Mode-Enabled Device 403 state to a Test-Mode-Locked Device 405 state (successful password entry) or a Test-Mode-Disabled Device 407 state (unsuccessful password entry).

A password may be required to transition from Test-Mode-Locked Device 405 state to test-Mode-Enabled device state. This is a temporary change, and on chip reset changes the chip back to the fused value. The chip cannot transition to test-Mode-Enabled device state from Test-Mode-Disabled test state. A chip can only be personalized once. If a password is used to go back to temporary test-Mode-Enabled, it may still be considered personalized.

Figure 10:
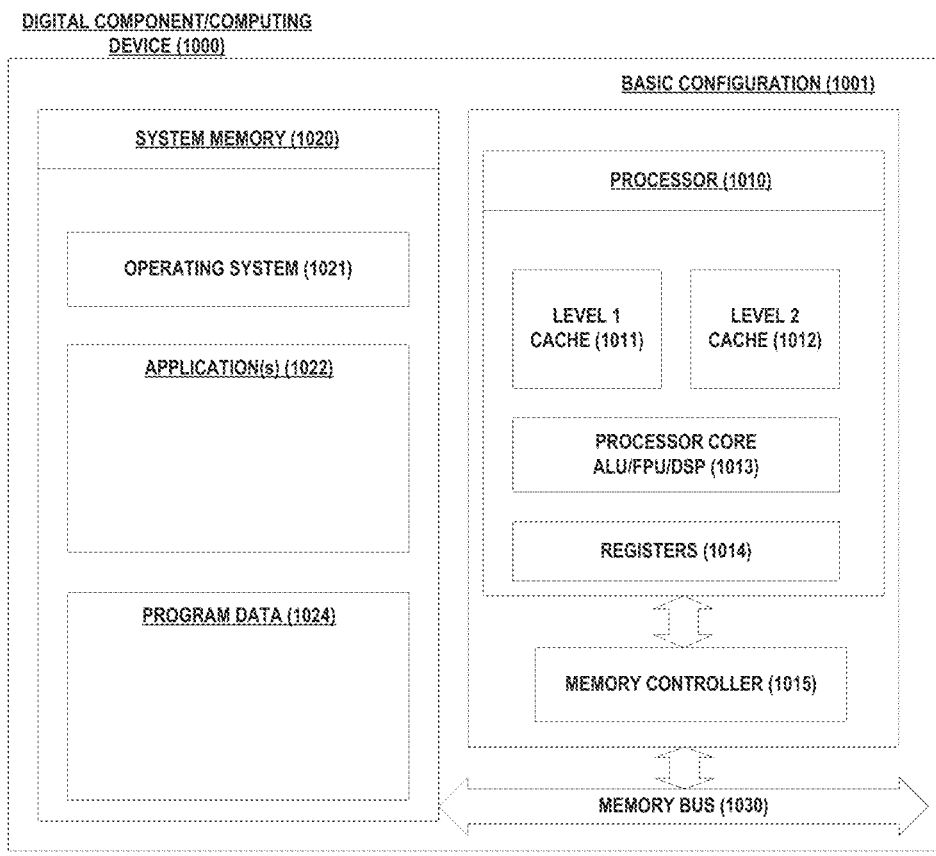
FIG. 10 is a block diagram illustrating an example computing device that implements aspects according to one or more embodiments described herein.

The state transitions and the setting of the security level are controlled by firmware 104 running on the chip 100 and may utilize the methods described in connection with FIGS. 4, 5, 6A, and 6B. The secure boot flow is controlled by firmware 104 running on the chip 100 and may utilize the methods described in connection with FIGS. 8A, 8B, and 8C. The firmware may be part of the embedded processor 104 as shown in FIG. 1. FIG. 10 provides further details of the hardware implementation as further explained below.

The transition to personalized device state 409 secures the chip device 100 to ensure that no private data is accessible during personalization by disabling the ports (debug port 101, flash test port 145 and scan test port 147) similar to the security measures taken while in the Test-Mode-Locked 405 or Test-Mode-Disabled 407 device states.

Personalized Device state 409, may be based on creation of a secret Device Initialization Key (DIK), exporting to the DIK to a Key-Management Server (KMS), and saving the DIK in on-chip non-volatile memory such as the key fuses 125. In this way, this state is characterized by the DIK asset within the device 100. A device 100 may be re-personalized, i.e., transitioned into the Personalized Device state 409, as many times as there are physical DIKs within the device (which may be set, for example, to 3 plus a test-DIK).

As with the other state transitions the firmware 104 running on the processor 103 controls the transition from the Personalized device state 409 to the configured device state 411. The firmware 104 also programs values in flash 111 and fuses 123, 125, 127, and/or 129 to personalize the device 100. Once such values are programmed by the firmware 104 the device 100 is considered configured (configured device state 411).

A fifth state, Configured Device 411 state, is a state in which the device has had any application or product specific fuses blown as needed in order to obtain a configuration for the application or product.

A sixth state, Provisioned Device 413, is a virtual state, and is defined by the firmware 104, keys, and certificates stored within the Device's on-chip flash memory. In this way, a device may be re-provisioned at any time by erasing the firmware and restarting a provisioning process. The processes associated with incrementing to Personalized Device state 409 and incrementing to Provisioned Device state 413 will be discussed later with respect to flow diagrams.

Physical Device State Security

An aspect of the invention is control of fuses as chip devices are incremented between states for physical device security. An aspect of the invention is enhancement of fuse security. Throughout the lifecycle of a chip device an attacker may attempt to restore a fuse or blow a fuse. An aspect of the invention is that each chip device may contain a separate bank of fuses (e.g. bank-0 or device state fuses 127) for managing the device state and device ID fuses 129 to store a device ID. In an example embodiment, there may be 27-bits in fuses that encode the state of the device but it is understood that the number of bits mentioned herein may vary depending upon the application. In addition to these bits, bank-0 may also contain a 3-bit lock and a 24-bit checksum.

As shown in the example device state decoder of FIG. 2, the 27 device state bits 201 may be divided into three 9-bit groups (group-0, group-1, group-2), and each group may be further broken down into three 3-bit sub-groups. The 3-bit sub-groups are spread out across physical fuse macros that contain the device's fuses. In this way, if an attack on a set of critical security fuses is attempted, the attack is likely to disturb some of the 27 device state fuses as well. An aspect of the invention is that the device-state may only be moved forward, by incrementing to a next state, such as those shown in FIG. 4, where the next 9-bit group has all its 3-bit sub-groups programmed to create a 9-bit pattern.

Also, throughout the lifecycle of a chip device, an attacker may attempt a fuse-sense attack. A fuse-sense attack is an attack on sensing/reading of fuse values, and may occur by forcing fuse shadow registers 915 (FIG. 9) to mis-latch the fuse data and remain at all zeros. As discussed above, there are two types of attacks on fuses. A fuse may be attacked by either (a) physically cutting the wire that indicates '0' causing it to become an open '1' or (b) physically rebuilding a fuse by depositing metal in order to convert the open '1' back to '0.' The fuse shadow register 915 associated with a fuse may alternatively or additionally be attacked.

To protect against fuse sense attacks at any state during manufacturing testing, the chip devices may default back into an original locked state. In an example embodiment, if a fuse sense attack were to succeed after the chip has been fused to one of the device states, the fuse shadow registers 915 would contain zeros instead of the fuse data (or otherwise stores a bit pattern that does not match the value stored in the device state fuses 127). In such a case, comparing the values stored in the fuse shadow register 915 and the device state fuses 127 may trigger a process that forces the chip device into the default Raw Device 401 state. An aspect of the invention may be, in the case of a fuse-sense attack, force the state of fuses in the chip device into the default Raw Device 401 state, which is a mostly locked state.

Figure 5:
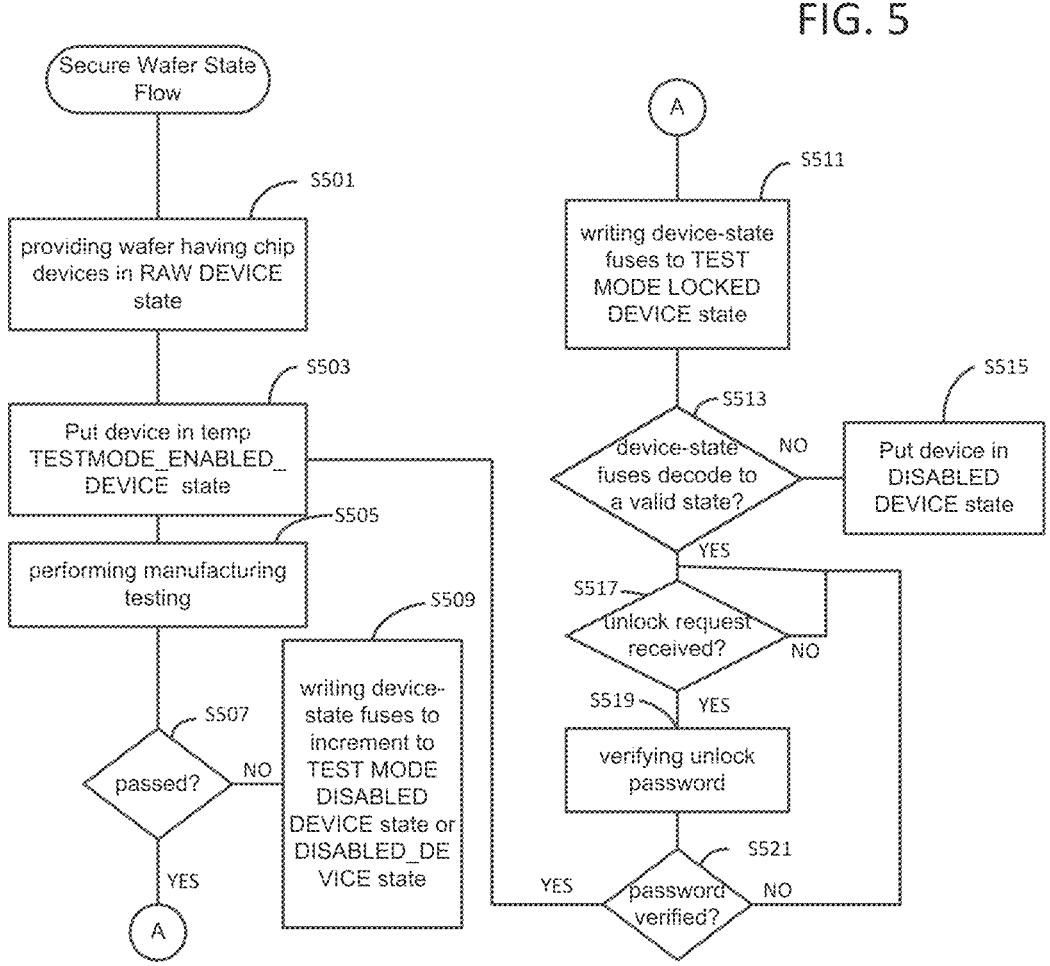
FIG. 5 is a flow diagram for chip device state management according to aspects of the present invention.

FIG. 5 is a flow diagram illustrating changing between physical device states based on the fuse states over a device lifecycle. The functions outlined in FIG. 5 may be performed by security coprocessor 131 (FIG. 1), for example, or embedded processor 103.

In S501 (FIG. 5), the Raw Device 401 (FIG. 4) state relates to a state of the chip device after a wafer is first manufactured. In this state all of the device-state fuses 127 (FIG. 1) are in a default state such as zero. In the Raw Device 401 state, the chip device is mostly locked in which only a path from the Debug port 101 (e.g., a serial wire debug (SWD) port) to the fuse controller 121 may be available.

In S503 (FIG. 5), after chip devices 100 (FIG. 1) have been powered up, a command may be sent to the fuse control and device state decoder 121 which causes fuse control and device state decoder 121 to write a correct pattern that "increments" the device state to Test-Mode-Enabled Device 403 (FIG. 4) state.

Once in Test-Mode-Enabled Device 403 (FIG. 4) state, the test mode ports and test mode features become enabled. In an example embodiment, this enablement of test mode ports may include a full Debug Port 101 (FIG. 1) path to access all the chip device registers and memory.

Other ports that may also be enabled include the flash test controller port 145 (FIG. 1) and the scan test ports 147. With these three test mode ports enabled, in S505 (FIG. 5) manufacturing testing is performed on the chip devices. This manufacturing testing may include any testing performed during the manufacture and initial distribution of the device, include for example running a set of Hardware Built-in Self Tests (HW BIST) as is known in the art.

In an example embodiment, in the Test-Mode-Enabled Device 403 (FIG. 4) state the fuse shadow registers 915 (FIG. 9) are over-ridable, and various debug features (such as sending clock signals to ports) may also be enabled. This makes the chip device more flexible for various testing and software development.

Once the manufacturing testing has been completed and a chip device passes all test modes (YES, S507), in S511 (FIG. 5) appropriate device state fuses 127 (FIG. 1) for production are blown. In one embodiment, group-1 device state fuses 127 are written with a correct pattern to "increment" the device state to Test-Mode-Locked Device 405 (FIG. 4) state. Alternatively, when a chip device does not pass a test (NO in S507), for example attributable to a manufacturing defect, both group-1 and group-2 fuses may be programmed to a pattern that skips over the Test-Mode-Locked Device 405 state and in S509 jumps straight to Test-Mode-Disabled Device 407 state. Alternatively, S509 may program the fuses to an invalid state, putting the device into a Disabled Device state.

An aspect of the invention is that the Test-Mode-Disabled Device 407 (FIG. 4) state is a functional state, and may be used as the device's final state. In this state, the test mode ports and features may be permanently disabled (e.g. by not providing any supported way in firmware 104 (FIG. 1) to switch out of the Test-Mode-Disabled Device 407 state. One permanently disabled, a part may be locked and may never be returned to a functional state. No access may be allowed for debug or mainline functionality.

The Test-Mode-Locked Device 405 (FIG. 4) state is also a functional state, and may be used as the device's final state if the product's security criteria permit. In this state, the test mode ports and features may be unlocked by, for example, a password. This password may be derived from the device-unique Device Initialization Key (DIK), and possibly a nonce from the TRNG 133 (FIG. 1) (for example, if One-Time-Password mode is enabled with fuses).

In S513 (FIG. 5), a comparison is made between patterns for known states and a pattern in the device state fuses 127 (FIG. 1) in order to check whether the device state fuses 127 decode to one of the previous states (Raw Device 401 (FIG. 4) state, Test-Mode-Enabled Device 403 state, Test-Mode-Locked Device 405 state, Test-Mode-Disabled Device 407 state). When the device state fuses 127 do not exactly decode to one of the previous four states (S513, NO), at S515, the device is put into a Disabled state (without updating the fuses 127). In an example embodiment, in S515 the chip device is completely locked down and disabled (permanently "bricked").

In an example embodiment, s S513 (FIG. 5) and S515 are performed using the fuse control and device state decoder 121 (FIG. 1). The fuse control and device state decoder 121 decodes a large bit pattern, for example a 27-bit pattern, of the fuse shadow registers 915 (FIG. 9), into for example, a 3-bit pattern representing a state identifier. The fuse control and device state decoder 121 may be unable to decode the large bit pattern into one of the predefined states (NO in S513), possibly due to a fuse-sense attack. In such case, the large bit pattern is considered as being incorrect, which causes, in S515, the device state fuses 127 to be programmed to a default decoding state, such as the Disabled Device state. The Disabled Device state is similar to the Raw Device 401 state in that both states force the chip device into a mostly locked down state. Disabled Device state differs from Raw Device state in that in the Disabled Device state, the Debut Port (e.g., SWD) path is also disabled. Thus, the Disabled Device state is completely locked down and disabled.

When the device state fuses 127 (FIG. 1) decode to one of the previous states (S513, YES), at s S517 (FIG. 5), S519, and S521, the chip device may be forced into a Test-Mode-Enabled Device 403 (FIG. 4) state (S503) if fuse bits indicate that the device is currently in Test-Mode-Locked Device 405 state and an unlock request including a password has been received (YES at S517), and the password has been verified (YES at S521).

In S519 (FIG. 5), the chip device may perform a verification operation to verify an unlock password. In an example embodiment, incrementing from Test-Mode-Locked Device 405 (FIG. 4) state to Test-Mode-Enabled Device 403 state may be controlled by second stage software (e.g., a boot loader). First and second stage software is, for example, software boot code that may be executed out of flash after the boot ROM code executes in Boot Loader 164 (FIG. 1).

In such case, third stage software that wishes to unlock the device to allow a test mode must request unlock via a verified signature header. In an example embodiment, the boot loader 163 (FIG. 1) performs the verification of the validity of a third stage image. Once the bootloader 163 verifies the image, the boot loader may honor the request and unlock the device to allow a test mode. Unlocking the device for a test mode may include allowing access to additional regions of memory in the chip device. This mechanism allows the boot loader 163 to retain the secrecy of the unlock process and simultaneously allow a clean interface for external unlock requests. Once devices are unlocked for test modes, the chip device will have the test capabilities and behavior of the Test-Mode-Enabled Device 403 (FIG. 4) state.

S503 (FIG. 5) putting the device into a Test-Mode-Enabled Device 403 (FIG. 4) state is performed if the unlock password is verified as correct (YES, S521).

In an example embodiment, if device state fuses 127 (FIG. 1) are written to a pattern that the Device State Decoder 121 does not decode to a known state, chip device may be passed through to the system in the Raw Device 401 (FIG. 4) state.

Secure Boot Flow

A chip device may be powered up and booted while in a variety of physical or logical states such as those shown in FIG. 4 as well as in field use. An aspect of the invention is a secure boot flow that the chip device uses over its lifecycle. The secure boot flow starts at the wafer manufacturing stage, continues on through the insertion of keys and firmware, the blowing of fuses, and may include an in-field firmware update process.

Figure 6A:
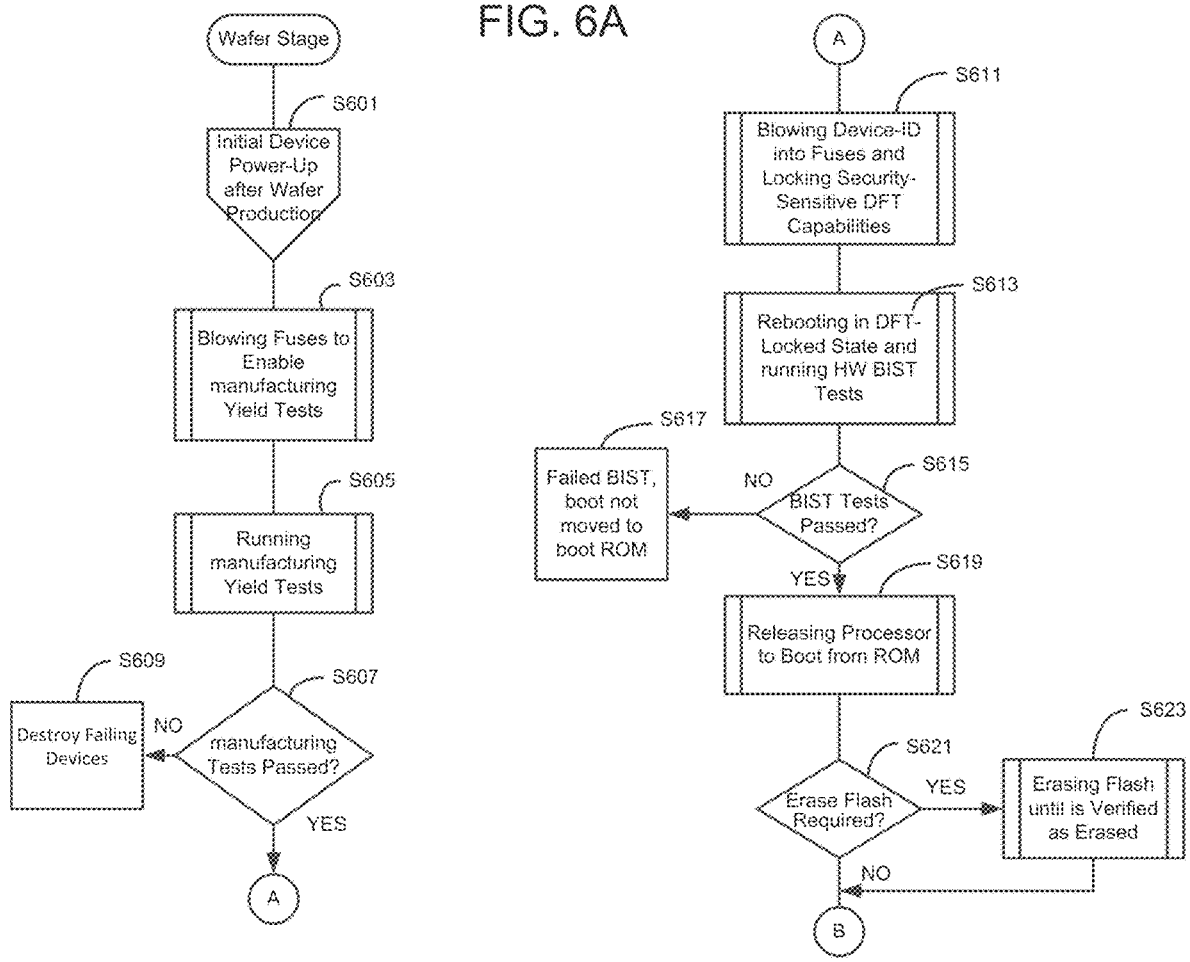
Figure 8A:
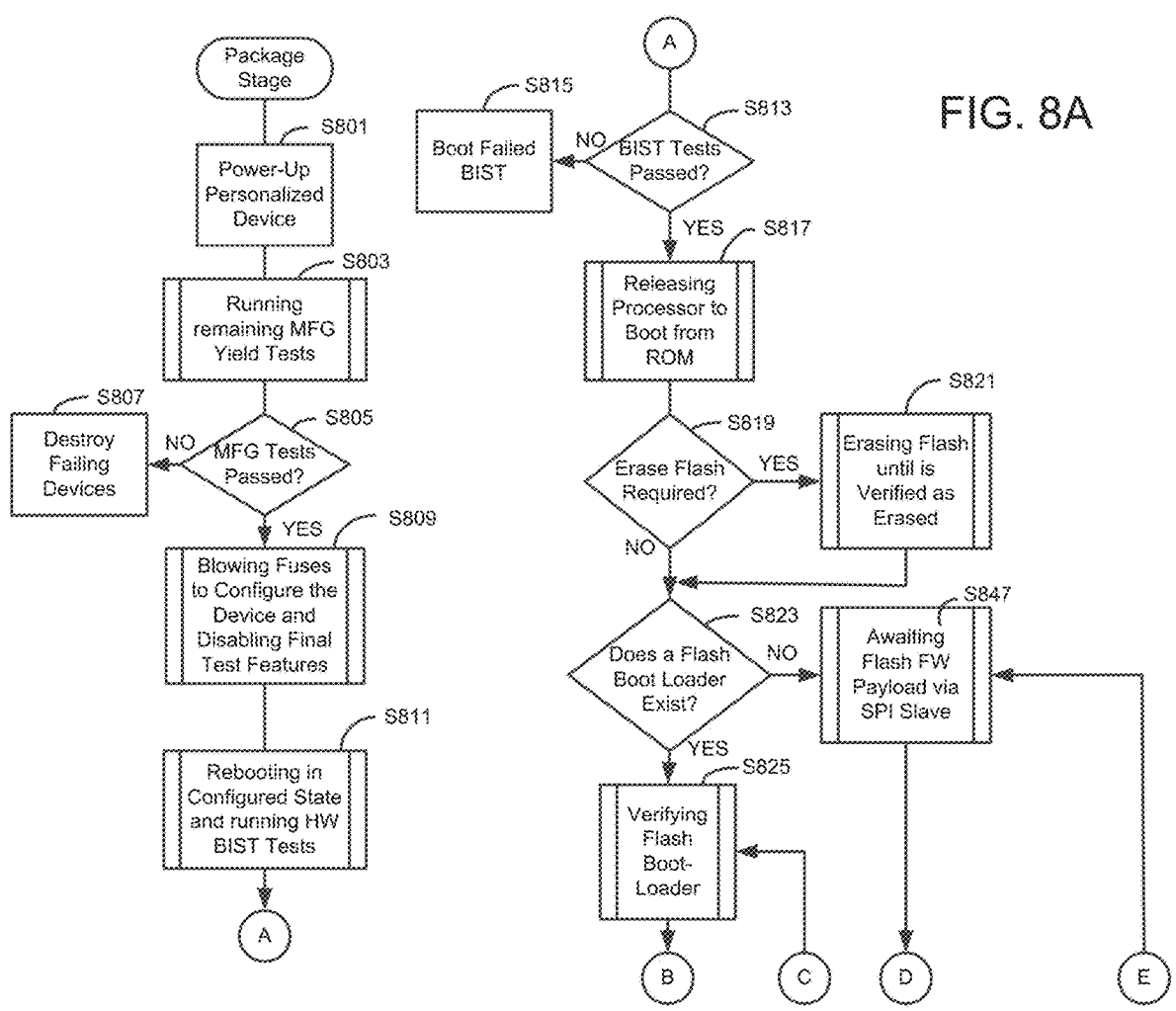
FIGS. 8A, 8B and 8C are flow diagrams for chip lifecycle for personalization and provisioning according to aspects of the present invention.
Figure 8B:
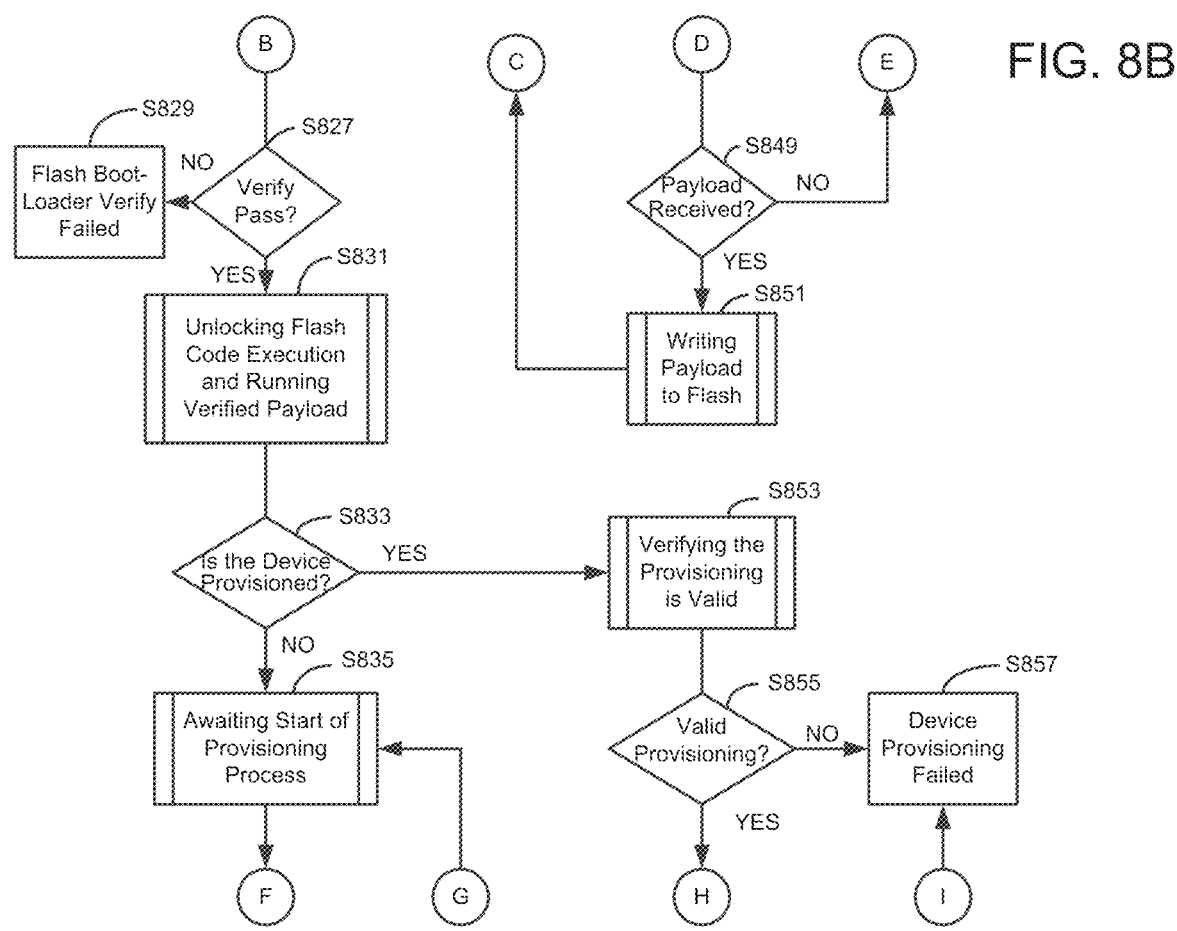
Figure 8C:
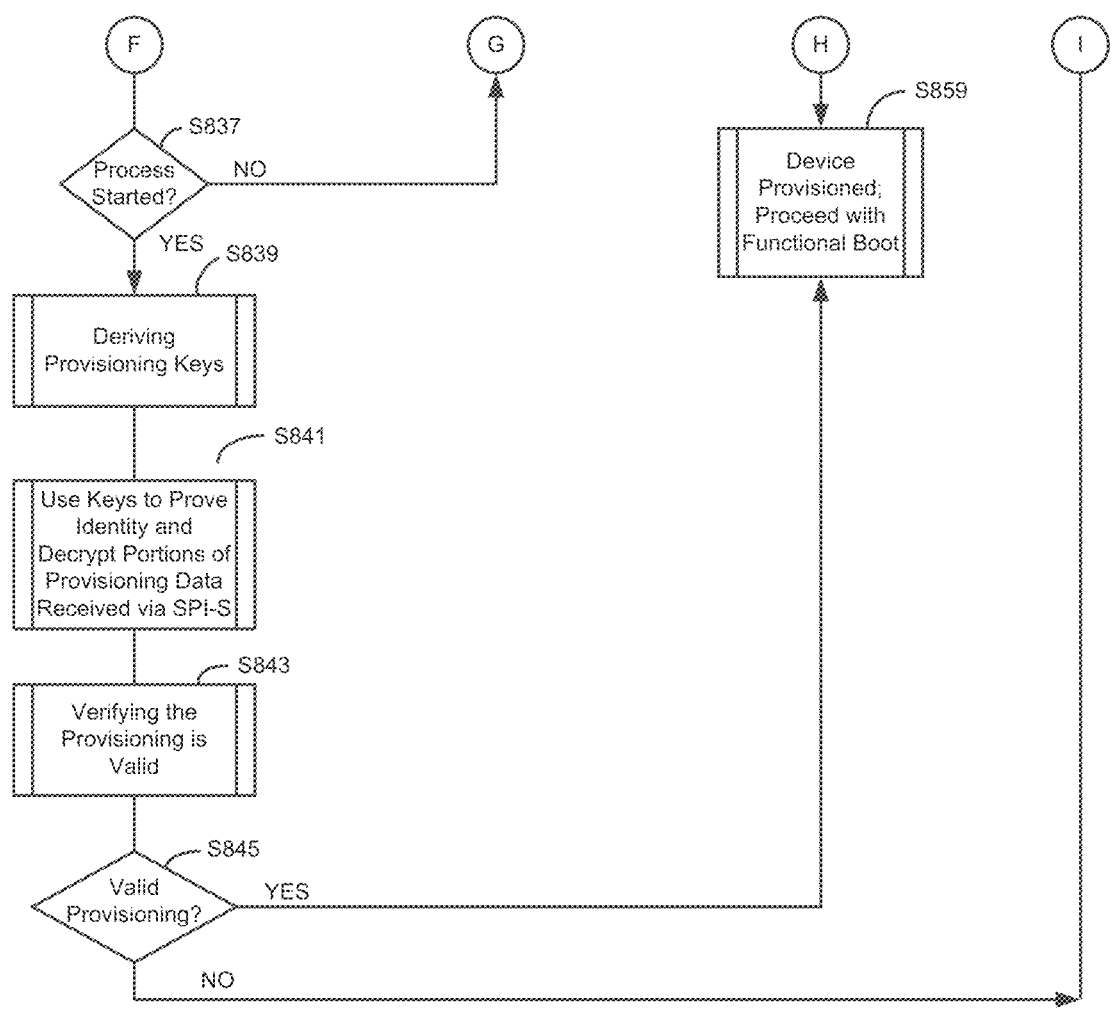

FIGS. 6A, 6B are a flow diagram for an example embodiment of the wafer stage as it relates to the secure-boot flow. As will be discussed later, FIGS. 8A, 8B, 8C are a flow diagram for an example of the Package stage.

As noted above, after wafer production, the chip devices are in a default Raw Device 401 (FIG. 4) state in which the test modes are not accessible from the outside. Test modes that are not accessible include tests that use the Flash Test Ports 145 (FIG. 1), TAP controlled Scan Test Ports 147, the Debug Ports 101, and any test feature that could leak information (such as TRNG 133 data readout) and that would compromise the device personalization process (creation of a device-unique identifier and secret, shared with the key-management servers). In S601 (FIG. 6), to begin a security-sensitive manufacturing testing process, the chip devices (not shown) on the wafer are powered up (e.g., so that many chip devices on the wafer may be tested in parallel).

Because chip devices are initially in a Raw Device state, after initial power-up of the chip device, in S603 (FIG. 6A), a set of device state fuses 127 (FIG. 1) are blown to increment the device state to Test-Mode-Enabled Device 403 (FIG. 4). In an example embodiment, if a fuse pattern does not correspond to a known state, such as the Test-Mode-enabled Device 403 state, the chip device will increment back to the default Raw Device 401 state. This operation ensures that if a fuse sense process is tampered with (which may cause the device state fuses 127 to remain at all zeros or, alternatively, switch to all ones), the chip device would not be capable of being re-opened into any security-sensitive test mode.

To blow these initial, device state fuses 127 (FIG. 1) while in this initial locked down state, one dedicated Debug Port 101 (e.g., an SWD) path to the fuse control and device state decoder 121 remains open. Through this path the device state fuses 127 are accessible. As previously mentioned, the device state fuses 127 may be a set of fuse bits. In an example embodiment, the device-state fuses are 27 bits programmed to an exact pattern to enable the device to be functional.

After the test mode has been enabled (i.e., device is incremented to Test-Mode-Enabled 403 (FIG. 4) state), in S605 (FIG. 6A), a set of manufacturing yield tests may be run.

In an example embodiment, to begin manufacturing yield testing, flash yield tests may first be run to screen-out any flash defects. Second, logic-BIST may be run to gain a majority of coverage over the logic and specifically that logic that is involved in the personalization process. Third, scan mode may be run to cover any gaps in the personalization logic coverage, and so that it may be locked and not have to be run again (to prevent a compromise of the security of the personalization process). Fourth, memory-BIST (on-chip SRAM and ROM) tests may be run to verify that the memories are functional. Fifth, a set of TRNG tests may be run to gain confidence in this security critical circuit, and so that any data readout test modes may be locked. At the end of this testing, any failing devices may be marked for destruction (NO, S607, S609).

After these manufacturing yield tests are run, chip devices that pass the manufacturing tests (YES in S607), in S611 (FIG. 6A) the Debug Ports 101 (FIG. 1) interface may be used to blow another set of device state fuses 127 to lock those test modes; the device may be incremented into the Test-Mode-Locked 405 state. The locking mechanism may be unlocked by writing a correct password into a register exposed via direct path from the Debug Port 101 interface. However, the expected password does not exist at this point, so the device will reject all passwords.

In an example embodiment, before or after manufacturing tests are run, the Debug Ports 101 (FIG. 1) interface may be used to program a device-unique identifier (Device-ID or Dev ID), such as a 64-bit identifier, into device ID fuses 129. For example, the Device-ID may be stored in 64 fuses and shadowed in 64 fuse shadow registers 915 (FIG. 9). The 64 fuses are offered by way of example, and the exact number of fuses is not critical. The Device-ID may be used as an index to the device and its keys (once keys are created and stored in the Key-Management Server 307 (FIG. 3)).

An aspect of the invention includes security-sensitive test modes that are locked in order to prevent any snooping on the device personalization process. Also, the test modes are only intended to be unlocked in the event of a field return, not on every device additional testing (all additional yield testing may be done with other test features, or by re-running the built-in-self-tests (BIST)). Aside from test modes, external interfaces with DMA-like (Direct Memory Access) capability on the internal system bus could also pose a threat to the personalization process. In an example embodiment, these capabilities may not be enabled by default and the bus security mechanisms will also default into a "secure state" (secure meaning that, by default, all the DMA-like capabilities will not have access privileges inside the device but will require explicit setup s by the security coprocessor 131 (FIG. 1) first).

At this point chip devices have been substantially tested, and are now ready for the personalization process (which may include creation of a device-unique key to be used as a shared secret between the chip device on the wafer 301 (FIG. 3) and the key-management servers (KMS 307)). Chip personalization may be performed in either the Test-Mode-Locked 405 (FIG. 4) state OR Test-Mode-Disabled 407 state in order to protect secrets. To begin the personalization process, chip devices on the wafer may again be powered up, a set of Hardware (HW) BISTs may be run (i.e., many chip devices on the wafer are tested in parallel), and the Embedded Processor 103 (FIG. 1) on each chip device may be re-booted from boot ROM 161.

In particular, the process begins in S613 (FIG. 6A) with the chip device being powered-up and a set of HW BIST tests being run. In an example embodiment, three hardware units containing finite-state-machines (FSM) may be involved in the test. These hardware units are the Design For Test (DFT) or flash test 141 (FIG. 1), fuse controller & device state decoder 121, and the TRNG 133, where the synchronization of events may be controlled by a Power Management Unit (PMU) FSM releasing resets. The Flash Test 141 runs logic-BIST and memory-BIST, the fuse control and device state decoder 121 runs a set of integrity tests, and the TRNG 133 runs its BIST. If all of these tests are successful (YES at S615), in S619 the embedded processor 103 is released from reset so that booting can be from ROM). If a test fails (NO at S615), a BIST has failed and the processor will not be boot-strapped (S617). If the BIST fails the part may go into a locked down (unusable) state. Reset may be applied to try again, but there may be an expectation that one failing BIST indicates BIST will fail again, and therefore the part is effectively useless.

Also, in S619 (FIG. 6) the embedded processor 103 (FIG. 1) may begin booting from boot ROM 161. For security reasons, in an example embodiment the instruction bus is gated from reading data from any other memory by default (e.g. flash 111 or SRAM 109). The boot-ROM 107 may contain an RSA public key, which has a primary purpose of being used to verify a stage-1 boot-loader in the on-chip flash 111. At S619 the stage-1 boot-loader does not exist in the ROM 107.

Before the ROM code checks for the stage-1 flash boot loader, at S621 (FIG. 6) it reads the state of an auto-erase pin. The pin may communicate off chip since it may be an external chip pin. If the auto-erase pin indicates that flash is required to be erased, in S623, flash is erased until it is verified that erase is completed.

At S625 (FIG. 6B) the ROM code may check for a stage-1 flash boot loader. At this point a boot loader does not exist in flash memory 111 (FIG. 1) (S625, NO: does not exist), so, at S643 a processing loop cycles until a flash firmware payload containing a boot loader is delivered via, for example SPI IN 149. Once the firmware payload is received (YES at S645), in S647, the payload is written to flash memory 111. In addition to a boot loader, the payload may also include other firmware for personalization. In an example embodiment, the payload contains personalization-specific code, as well as an RSA public key for the encryption of the DIK for export to the Key-Management Server (KMS 307).

Once stored in flash memory 111 (FIG. 1), in S627 (FIG. 6B), the ROM firmware 107 performs a hash function on the personalization-specific code and performs an RSA Verify operation to verify the boot loader with a public key that is embedded in the firmware. In S629, a decision is made as to whether or not the verification of the personalization-specific code has passed.

In an example embodiment, in performing a decision on whether or not the verification passed, the ROM code may not use a branch. Instead, it XORs a computed SHA-256 digest with the expected hash digest portion of the RSA signature (the resulting value is a 384-byte constant, with padding at the top and 256-bits of zeros at the bottom if the verify passes). This 384-byte constant is then hashed, e.g., using SHA-256, to produce a smaller value. This 256-bit result is then written into a register that connects to a 256-bit hardware comparator. That comparator will then only allow the flash to be unlocked for execution if all bits match the expected 256-bit constant (which is embedded in the gates of the hardware comparator).

If the verification of the personalization firmware fails (NO, S629), in S631, the device must be rebooted to try again.

If the verification passes (YES in S629), the ROM code first writes the, for example, 256-bit SHA-256 digest, into an RWR Hidden Key Ladder (HKey) register that is only writable by the ROM 107.

In the example embodiment, if the verification passes (YES in S629), in S633 the ROM 107 unlocks the flash 111 and SRAM 109 for additional flash code execution, performs instruction fetches and begins running the stage-1 boot loader (the personalization firmware).

In S635 (FIG. 6B), execution of the personalization firmware may include creation of random secret data with which to derive, for example, two 256-Bit device-unique secrets. One secret may be the Device Initialization Key (DIK), which may act as the root shared secret between the Device 301 and the Key-Management Servers (KMS 307). The other secret may act as an asymmetric private key (HPriv), from which the personalization firmware may generate a corresponding asymmetric public key (HPub) that will be sent to the KMS 307 as well. In an example embodiment, both of these secret values may be generated from a pair of global secret constants (HWC and RBC), as well as a pair of device-unique secrets (for example, each 256-Bits in size). The device's on-chip TRNG 133 (FIG. 1) may be used as the source to create the device-unique secrets (OBS, FBS, & RSR). An OTP-Based-Secret (OBS) component of the DIK may be burned into key fuses 125. A Flash-Based-Secret (FBS) component of the DIK may be written to flash 111. In an example embodiment, an RSR component may act as an initial random seed for later "stirring" or "mixing" with run-time generated random numbers. This "stirring" or "mixing" may be a standard cryptographic use of random entropy.

Once the device-unique secrets are stored in non-volatile memory (NVM)-flash 111 (FIG. 1) or fuses 125, the firmware then may instruct a security coprocessor 131 (e.g., a SHA engine) to derive the DIK, HPriv, and another key called XI PHIK (used as an HMAC key for the export of the encrypted DIK). All of these SHA-based derivations may be defined by specific hardware operation certificates, and use an internal secret register file called a Hidden Key-Ladder for holding the root secrets and intermediate values. The SHA hardware may interact directly with the HKey-Ladder over a private bus. This initial generation of DIK is visible to the embedded processor 103, so the processor may store the DIK in memory. The generation of HPub from HPriv may be done by firmware. At this point, firmware has collected DIK & HPub, and XI PHIK is available via SHA HMAC certificate that may auto-load XI PHIK from the secret key-ladder.

In S637 (FIG. 6B), with DIK saved, the personalization firmware then may burn fuses to permanently disable the HKey certificate used to create the DIK into the firmware readable register (FRR). From this point on, the DIK is no longer visible to the embedded processor 103 (FIG. 1), and is stored (still resident in registers) into a non-volatile memory (NVM), such as flash 111. The DIK may go through a series of SHA HKey operations to create a firmware-version-bound root-key.

In S639 (FIG. 6B), the personalization firmware may encrypt and export the DIK, HPub, and Device-ID to the key-management server (KMS 307 (FIG. 3)). In an example embodiment, the personalization firmware may RSA-Encrypt this data bundle using a personalization public key obtained from the flash boot loader. Once encrypted, it then may create a MAC of the data using the SHA-256 HMAC, with an HKey certificate using XI PHIK as the key. The MAC and the encrypted DIK/DevID may then be exported to the KMS 307 via SPI-Slave 251.

At S641 (FIG. 6B), with the DIK stored locally in NVM, and also in the key-management servers 307, the chip devices have unique shared secrets that are indexed by DevID on the KMS 307 side. At this point, the state of the device is the Personalized Device 409 (FIG. 4) state.

In between the personalization of the functioning chip devices on Wafers and the provisioning of the devices in packaged form, the key-management servers 307 may prepare individual provisioning payloads for each chip device. The key-management servers (KMS 307) contain a list of all personalized chip devices, indexed by DevID, and their individual Device Initialization Keys (DIK). The KMS 307 also has a copy of the personalization firmware that is resident in the flash of each device as a stage-1 boot loader. With the personalization firmware and the DIK, the KMS 307 may derive a key that is specific to a device and bound to the firmware image (and may be called FW DIK). Using this key, the KMS 307 may pre-encrypt the provisioning payload (Endorsement Primary Seed (EPS), X.509 certificates, and functional firmware), or at a minimum the EPS, with each device-unique FW DIK. This means that by the time the wafers arrive at the packaging location, the individual provisioning payloads may be pre-computed.

Figure 7:
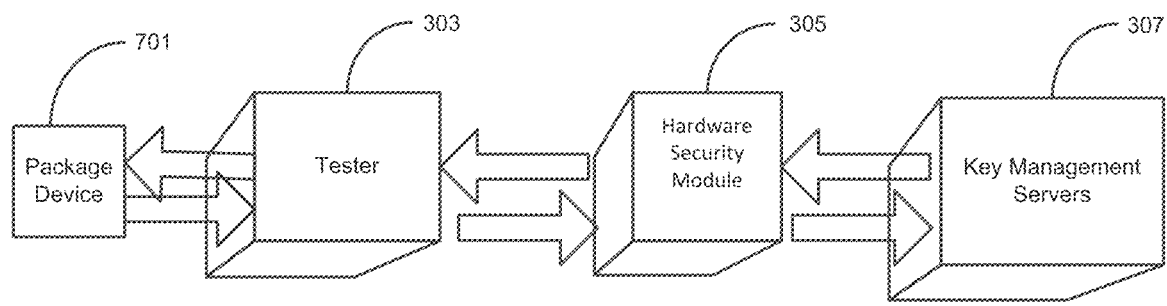
FIG. 7 is a diagram for a package test-floor system according to aspects of the present invention.

FIG. 7 shows an example test floor system for the Package Stage in which the package device undergoes provisioning. To provision a package device 701, the key-management server (KMS 307) may send and receive data, to and from the package device 701 by way of Hardware Security Module 305 and Tester 303.

FIG. 8A, 8B, 8C are flow diagrams illustrating the package stage which may be implemented by, for example, the wafer test floor system shown in FIG. 7. The flow will be described with reference to the states in FIG. 4 and the semiconductor chip device of FIG. 1.

During the Package Stage, wafers arrive containing devices in the Personalized Device 409 (FIG. 4) state (with some yield marked for destruction due to manufacturing test failure). At this arrival location the wafers may be diced and the devices assembled into their packages (package device 701 (FIG. 7)). Once packaged, at S801 (FIG. 8A) individual package devices 701 are powered up to begin the remainder of the manufacturing yield tests. At S803, the remainder of the manufacturing tests may be run to characterize and determine the fitness of each device. The remainder tests may take longer and be more exhaustive than the tests ran at the Wafer Stage. The manufacturing tests that are run at this location may include flash integrity tests, Logic BIST, and some analog qualification tests. In an example embodiment, these tests do not enable extraction of secret information installed during the device personalization sequence, done previously during Wafer Stage. For example, scan tests are run at Wafer Stage before personalization.

In S805, a decision is made as to whether or not a packaged device 701 has passed the remainder manufacturing tests. In an example embodiment, at S807, any devices that do not meet the required minimum standards (NO at S805) are considered failing devices and may be destroyed (for example, to prevent reverse engineering of secrets).

For the functioning packaged devices that do pass remaining manufacturing tests (YES at S805), at S809, additional remaining fuses 123 (FIG. 1) may be blown to configure each packaged chip device into its desired feature set and modes. At this point each chip device has been incremented to the CONFIGURED DEVICE state 411.

After all the devices have been fuse-configured, they may be rebooted in order to perform the provisioning process. To provision the packaged devices 701 (FIG. 7), a key-management server (KMS 307) sends and receives data, to and from the packaged devices 701, by means of a hardware security module (HSM 305 (FIG. 3)) on the test floor. As in the case for provisioning, the HSM 305 may not be relied upon directly for the confidentiality of the provisioning secrets. Rather it may be used to buffer up payloads to handle temporary connectivity issues with the KMS 307 and to monitor and gather statistics about what is going on during the provisioning process.

In an example embodiment, the packaged chip device may be provisioned with valid certificates and market-specific functional firmware. Although the personalization firmware consists of a stage-1 firmware module, the functional firmware may be broken into multiple modules. To get these certificates and the functional firmware into the device, at S811, the packaged chip may be rebooted up in a similar manner to the personalization flow. The packaged chip device is powered-up and a set of BIST tests may be run. Three hardware units containing finite-state-machines (FSM) may be involved in these tests (DFT 141 (FIG. 1), Fuse Controller 121, TRNG 133), and the synchronization of these events may be controlled by the PMU FSM releasing resets. The DFT unit 141 may run logic BIST and memory BIST, the Fuse Controller 121 may run a set of integrity tests, and the TRNG 133 may run its BIST. If all of these tests are successful (YES at S813 (FIG. 8A)), at S817 the Embedded Processor 103 may be released from reset (so that boot processing is performed by boot ROM 107). Otherwise (NO, S813), at S815 at least one test has failed.

In an example embodiment, for security reasons, the instruction bus may be gated from reading data from any other memory at this point (i.e. flash 111 (FIG. 1) or SRAM 109). The boot ROM 107 may contain an RSA public key, which has as a primary purpose to verify the stage-1 boot loader in the flash 111. At this point the stage-1 boot loader is the personalization firmware. However, before checking for the stage-1 bootloader, the ROM code may check whether a flash auto-erase is being requested by checking the value of a pin.

In particular, before the ROM code checks for the stage-1 flash boot loader, in S819 (FIG. 8A), it may read the state of the auto-erase pin. If it is set (YES at S819), at S821, the ROM firmware may erase the entirety of flash.

At this point, at S823, the ROM code may check for a stage-1 flash boot loader. At this point the boot loader exists as the personalization firmware. However, if a stage-1 boot loader does not exist (NO at S823), a processing loop cycles through s S847, S849, and S851 until a firmware payload is received and written to flash (comparable to s S643, S645, and S647 in FIG. 6).

At S825 (FIG. 8A), the stage-1 boot loader undergoes verification. To verify the stage-1 flash bootloader, the ROM firmware may generate a hash of the code using a hash function and perform an RSA Verify operation with a public key embedded in the firmware. In S827, a decision is made as to whether the boot loader passes the verification process.

In an example embodiment, for the decision on whether or not the boot loader verification passed (S827 (FIG. 8B)), the ROM code may not use a branch. Instead, it may XOR a computed SHA-256 digest with the expected hash digest portion of the RSA signature (YES, at S827; the resulting value is a 384-byte constant, with padding at the top and 256-bits of zeros at the bottom if the verify passes). This 384-byte constant is then hashed, e.g., using SHA-256, to produce a smaller value. This 256-bit result is then written into a register that connects to a 256-bit hardware comparator. That comparator may then only allow extra areas in the flash 111 (FIG. 1) to be unlocked for execution (S831) if all bits match the expected 256-bit constant (which is embedded in the gates of the hardware comparator).

If the verification of the personalization firmware fails (NO at S827), at S829, the device must be rebooted to try again, or the auto-erase feature must be used to reload another signed boot-loader.

In an example embodiment, if the boot loader can be verified (YES, S827), the ROM code may first write, for example, a 256-bit SHA-256 digest into the RWR Hidden Key Ladder (HKey) register (not specifically shown) that is only writable by the ROM, and lock it. This register is not readable by any agent other than by the dedicated SHA HKey certificate processors. Since at this point the raw DIK creation certificate has been revoked via fuses, the boot loader firmware may be forced to include its firmware hash when it derives its Device Initialization Key (called FW DIK).

Next, at S831 (FIG. 8B), the ROM firmware may unlock extra areas in the flash 111 (FIG. 1) and SRAM 109 for instruction fetches and begin running the stage-1 boot loader (the personalization firmware).

Since the device is already personalized, at S833, the personalization firmware may now check to see if the chip is provisioned. It does this by looking for the certificates. However, at this point the certificates may not exist and the chip device will be considered as not being provisioned (NO, S833).

Since the device has not yet been provisioned, at S835, a loop process is executed to wait for a provisioning payload via, e.g. SPI-Slave 135.

Once the firmware detects the start of the provisioning process via SPI-Slave 135 (YES, S837 (FIG. 8C)), at S839 the firmware may begin to derive its provisioning keys. In an example embodiment, the security coprocessor 131 (FIG. 1) (for example, an SHA-256 control processor) is instructed to execute a specific RW DIK-creation operation (for which it has a hardware-embedded certificate) using the hidden key-ladder (HKey). The embedded processor 103 then uses the security coprocessor 131, such as a SHA-256 control processor, and HKey to derive a set of three provisioning keys (one for remote attestation of the Device, one for encrypting the provisioning payload, and one for providing authentication and integrity over the provisioning payload). All of these keys may be rooted in a firmware-bound version of DIK (called FW DIK), which may be derived by the security coprocessor 131 (SHA-256 control processor) creating a hash of {HWC, RBC, OBS, FBS, RWR}, and writing the resulting digest to ISR0. ISR0 may then be used to derive the three provisioning keys.

In S841 (FIG. 8C), the key-management server (KMS 307 (FIG. 3)) may read the DevID from the device, and issue a challenge to make the device prove its identity. A response may involve operating on the challenge nonce with the "Am I the Device" attestation key, which is derived from the flash-firmware-bound version of DIK. This ensures that the device has the correct DIK, as well as the correct version of the personalization firmware (as the ROM has mixed its hash into KDF 307). In an example embodiment, the provisioning payload may contain the following, with (at a minimum) the EPS encrypted:
Endorsement Primary Seed (EPS)
Signed X.509 Certificate with an RSA Subject Public Key.
Signed X.509 Certificate with an ECC Subject Public Key.
Market-specific functional flash firmware.

In S841 (FIG. 8C), portions of the provisioning payload may be decrypted.

In an example embodiment, the payloads may contain market-specific functional flash firmware, device-unique Endorsement Primary Seeds (EPS), and two Signed X.509 certificates (1 containing an RSA Subject Public Key, and 1 containing an ECC Subject Public Key). These Subject Public Keys are the public half of an Endorsement Key pair (EK), which may be verified by the device using its EK certificate (i.e. the X.509 certificates just received).

At S843 (FIG. 8C), the device may perform this verification by deriving the EK pair using the EPS and a set of parameters, and then they compare the resulting EK.Pub with one contained in the EK certificate. Once this verification process has been completed, at S845, a decision is made as to whether the provisioning payload is valid. If the provisioning payload is determined to be valid (S845, YES), the device is considered to have been provisioned, and its state becomes Provisioned Device 413 (FIG. 4) state. At this point, S859, the chip device is provisioned and may continue on with functional boot.

An aspect of the invention includes that the process of decrypting and verifying the provisioning payload (both the entire signed payload verification, and the EK verification; s S841, S843, S845), may be done immediately, or at some other time (or more trusted location). This sequence may depend on the sequence in the personalization firmware.

Also, every time a device boots up, in an example embodiment, it must repeat this verification process. Therefore, the device's state may be initially Configured Device 411 (FIG. 4) state, and then becomes Provisioned Device 413 state only after verifying both EK key pairs (RSA and ECC) with its two certificates. Subsequently, this final device state transition may be a soft one and may not be dependent on the fuses like the previous state-changes.

In the case that device provisioning fails, at S859, a secure method may be used to communicate problems with boot, with a message such as, boot loader verification failed, or provisioning verification failed.

If necessary, a chip device 100 may be re-provisioned at any time. This may be necessary due to a firmware bug, or simply due to a need to change a device originally destined for one market, into a device provisioned for another market. The re-provisioning flow may begin in the same manner as a normal boot, except for one minor difference: the device already contains functional firmware, an EPS, and two valid certificates. For this reason, the method for triggering re-provisioning may be to erase all or some of the flash firmware and data.

The erasing of flash data may be triggered by reading the value of a specific pin, or by communicating with the device's firmware by any one of its interfaces. The purpose of the pin is to force erasing of the entire flash, excluding the personalization data but including the boot-loader (which may be the only method if device contains valid signed firmware but the re-provisioning process may not be started). In an example embodiment, if the boot-loader is erased, the device must first receive a new one through a similar method as the one used during device personalization (e.g., through reception of a flash-firmware payload using the SPI-Slave interface). Once the boot loader is in place (or if it wasn't erased), the flow may proceed similar to the original provisioning one. First, the key-management server (KMS 307) makes the device prove that it is a valid device by reading the device identifier, and then issuing a challenge that will prove whether or not it contains the correct FW HIK.

If the boot loader 163 (FIG. 1) is replaced with a new one, then the FW HIK-derived key used in the challenge may change as well (e.g., because it includes the hash of the boot loader firmware). Assuming the device passes the challenge, it then may await a new flash provisioning payload via SPI-Slave interface (not shown). Through this interface, the chip device 100 receives the new signed payload from the KMS 307 (FIG. 3), and encrypted with a key similar to the one used in the HIK-challenge. At this point the chip device 100 may verify the provisioning (by the same method as before), transition into the Provisioned Device 413 state, and continue on with functional boot.

Fuse Controller

Figure 9:
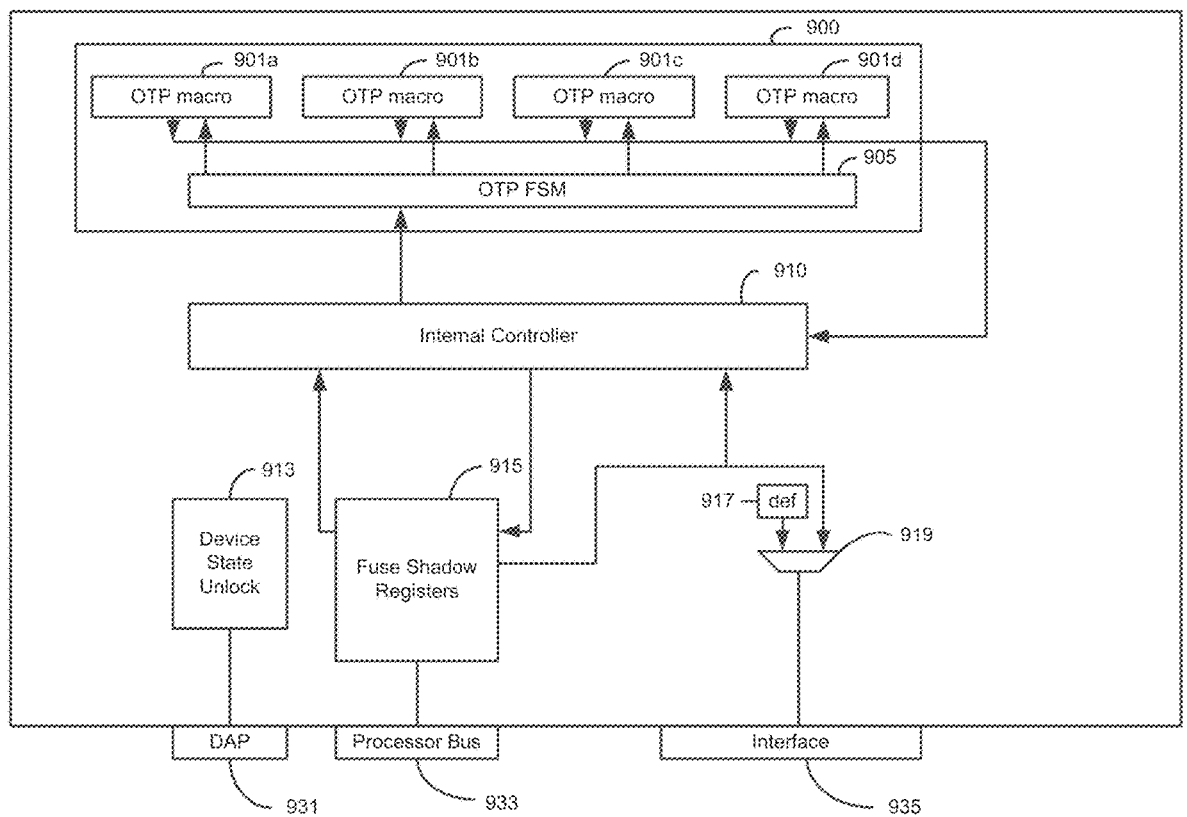
FIG. 9 is a block diagram for an example one-time programmable memory controller according to aspects of the present invention.

FIG. 9 is a block diagram of an example embodiment of the fuse control and device state decoder 121 that handles programming of a set of associated fuse macros 900 including OTP (one time programmable) macros 901*a-d*. In this example embodiment, fuse shadow registers 915 may redundantly store bit values of fuse macros 900. The redundant storage of fuse bits may be arranged in a manner that provides an extra layer of protection for control of any test mode or security-sensitive features. The redundant storage of bit values of fuse macros may also incorporate mechanisms to protect from attacks on shadow operation. For example, an attack on fuse macro latch operation may be detected as the attack could cause all the fuse shadow registers 915 to become zero, even when the fuse macros 900 themselves are not zeros.

In the example fuse controller 121, fuse bits may be programmed by way of fuse shadow registers 915, in which the actual fuse macros are blown internally by the fuse controller. Functions associated with programming actual fuses 900 and reading fuse values may be handled by an internal controller 910. Also, the fuse controller 121 may include a Finite State Machine 905 to handle programming of particular fuse macros 900. Programming of fuse macros 900 may be enabled based on a command transmitted through a serial wire debug port (SWDP) 931 to a device state unlock circuit 913. The device state unlock circuit 913 enables a device state stored in the fuse macros to be incremented to a next device state. A mechanism for setting the device state to default may be provided by default parameter holding circuit 917 and logic gate 919, which control access to the fuses via an interface 935. A processor bus 933 provides a path for reading or programming fuse values stored in fuse shadow registers 915.

FIGS. 1, 2 and 9 provide exemplary implantation details of the semiconductor chip device 100. FIG. 10 is a high-level block diagram of an exemplary device (1000) that may include the semiconductor chip device 100, or may be used to implement various components of the semiconductor chip device 100, including one or more of the embedded processor 103, firmware 104, security coprocessor 131 and internal controller 910.

In accordance with at least one embodiment, digital component/computing device (1000) that may be configured to perform various functions supporting the secure device states and boot flows. As mentioned above, the state transitions are controlled by firmware 104 running on the chip 100 and may utilize the methods described in connection with FIGS. 4, 5, 6A, and 6B. The secure boot flow is controlled by firmware 104 running on the chip 100 and may utilize the methods described in connection with FIGS. 8A, 8B, and 8C. The firmware may be part of the embedded processor 104 as shown in FIG. 1. FIG. 10 provides further details of the hardware implementation as further explained below.

In a very basic configuration (1001), the computing device (1000) typically includes one or more processors (1010) and system memory (1020). A memory bus (1030) can be used for communicating between the processor (1010) and the system memory (1020).

Depending on the desired configuration, the processor (1010) can be of any type including but not limited to a system on a chip (SoC), a microprocessor (µP), a microcontroller (µC), a digital signal processor (DSP), or any combination thereof. The processor (1010) can include one more levels of caching, such as a level one cache (1011) and a level two cache (1012), a processor core (1013), and registers (1014). The processor core (1013) can include an arithmetic logic unit (ALU), a floating point unit (FPU), a digital signal processing core (DSP Core), or any combination thereof. A memory controller (1015) can also be used with the processor (1010), or in some implementations the memory controller (1015) can be an internal part of the processor (1010).

Depending on the desired configuration, the system memory (1020) can be of any type including but not limited to volatile memory (such as RAM), non-volatile memory (such as ROM, flash memory, etc.) or any combination thereof. System memory (1020) typically includes an operating system (1021), one or more application(s) (1022), and program data (1024). The application(s) (1022) may include software implementations of the various components of the digital component 107 for supporting the hardened random number generator in accordance with one or more embodiments described herein. Program Data (1024) may include storing instructions that, when executed by the one or more processing devices, implement a method(s) for performing the various functions of the digital component 107 as described in detail above. In some embodiments, the application(s) (1022) can be arranged to operate with program data (1024) on an operating system (1021).

The computing device (1000) can have additional features or functionality, and additional interfaces to facilitate communications between the basic configuration (1001) and any required devices and interfaces.

System memory (1020) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of the device (1000).

The computing device (1000) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (1000) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In accordance with at least one embodiment, several portions of the subject matter described herein may be implemented via one or more ASICs, Field Programmable Gate Arrays (FPGAs), digital signal processors (DSPs), or other integrated formats. However, those skilled in the art will recognize that some aspects of the embodiments disclosed herein, in whole or in part, can be equivalently implemented in one or more integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory computer-readable medium used. Examples of a non-transitory computer-readable medium include, but are not limited to, the following: a recordable type medium such as a flash drive, a hard disk drive, a Compact Disc (CD), a Digital Video Disk (DVD), a digital tape, and a computer memory, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The systems and methods discussed herein do not require collection or usage of user personal information. In situations in which certain implementations may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of provisioning a semiconductor chip device, the method comprising:
   determining that the semiconductor chip device is ready for provisioning based on a bit pattern stored in device fuses within the semiconductor chip device;
   writing boot processing code to non-volatile memory of the semiconductor chip device;
   verifying an authenticity of the boot processing code;
   creating, using a certificate, a device initialization key for generating a plurality of provisioning keys;
   disabling the certificate used to create the device initialization key for generating the provisioning keys by blowing device fuses associated with the certificate, the blowing of the device fuses associated with the certificate preventing an embedded processor of the semiconductor chip device or an external device from accessing the certificate or recreating the device initialization key;
   exporting the device initialization key to a key management server;
   deriving the provisioning keys using the device initialization key and the boot processing code;
   proving identity to the key management server by providing a device ID and one of the provisioning keys;
   decrypting provisioning data using another of the provisioning keys; and
   verifying that the provisioning data is valid.

2. The method of claim 1, wherein the non-volatile memory is flash memory.

3. The method of claim 1, wherein the device initialization key is stored in a firmware readable register.

4. The method of claim 1, wherein the provisioning data includes application-specific flash firmware; and
   wherein the method further comprises allowing, by the boot processing code, storage of the application-specific flash firmware in the non-volatile memory.

5. The method of claim 1, wherein the certificate is contained within the boot processing code.

6. The method of claim 1, further comprising, responsive to determining that the bit pattern corresponds to an unknown pattern, locking the semiconductor device such that ports and memory of the device are permanently disabled.

7. The method of claim 1, wherein the boot processing code and the provisioning data are received via a serial peripheral interface.

8. The method of claim 1, wherein the one of the provisioning keys is a device attestation key.

9. The method of claim 8, wherein the identity is proven by providing the device ID and the device attestation key to the key-management server and receiving confirmation from the key-management server.

10. The method of claim 1, wherein the device ID is stored within the device fuses.

11. The method of claim 1, wherein the provisioning keys are derived by a security coprocessor.

12. A semiconductor chip device, comprising:
device fuses;
a non-volatile memory;
a processor;
a storage device storing instructions, when executed by the processor, cause the semiconductor chip device to:
determine that the semiconductor chip device is ready for provisioning based on a bit pattern stored in the device fuses;
write boot processing code to the non-volatile memory;
verify an authenticity of the boot processing code;
create, using a certificate, a device initialization key for generating a plurality of provisioning keys;
disable the certificate used to create the device initialization key for generating the provisioning keys by blowing device fuses associated with the certificate, the blowing of the device fuses associated with the certificate preventing the processor or an external device from accessing the certificate or recreating the device initialization key;
export the device initialization key to a key management server;
derive the provisioning keys using the device initialization key and the boot processing code;
prove identity to the key management server by providing a device ID and one of the provisioning keys;
decrypt provisioning data using another of the provisioning keys; and
verify that the provisioning data is valid.

13. The semiconductor chip device of claim 12, wherein the non-volatile memory is a flash memory.

14. The semiconductor chip device of claim 12, wherein the device ID is maintained in the device fuses.

15. The semiconductor chip device of claim 12, wherein the provisioning data includes application-specific flash firmware and the boot processing code allows storage of the application-specific flash firmware in the non-volatile memory.

16. The semiconductor chip device of claim 12, wherein the boot processing code is a boot loader.

17. The semiconductor chip device of claim 12, wherein the identity is proven by providing the device ID and a device attestation key to the key-management server and receiving confirmation from the key management server.

18. The semiconductor chip device of claim 12, wherein the processor is further configured to, responsive to detecting an unknown pattern of the device fuses, lock the semiconductor chip device such that ports and memory of the semiconductor chip device are inaccessible.

19. The semiconductor chip device of claim 12, wherein the bit pattern is spread across fuse-macros of the semiconductor chip device.

20. The semiconductor chip device of claim 12, further comprising a security coprocessor, wherein the provisioning keys are derived by the security coprocessor.

* * * * *